United States Patent
Jung et al.

(10) Patent No.: US 10,523,304 B2
(45) Date of Patent: Dec. 31, 2019

(54) NETWORK DISCOVERY AND BEAM ACQUISITION IN 5G RAT BEAM CELL OPERATION

(71) Applicant: Intel IP Corporation, Santa Clara, CA (US)

(72) Inventors: Hyejung Jung, Palatine, IL (US); Tommaso Balercia, San Francisco, CA (US); Xavier Carreno Bautista De Lisbona, San Jose, CA (US); Alexei Davydov, Nizhny Novgorod (RU)

(73) Assignee: Intel IP Corporation, Santa Clara, CA (US)

(*) Notice: Subject to any disclaimer, the term of this patent is extended or adjusted under 35 U.S.C. 154(b) by 0 days.

(21) Appl. No.: 15/747,409

(22) PCT Filed: Dec. 24, 2015

(86) PCT No.: PCT/US2015/000425
§ 371 (c)(1),
(2) Date: Jan. 24, 2018

(87) PCT Pub. No.: WO2017/023232
PCT Pub. Date: Feb. 9, 2017

(65) Prior Publication Data
US 2018/0241458 A1    Aug. 23, 2018

Related U.S. Application Data

(60) Provisional application No. 62/199,893, filed on Jul. 31, 2015.

(51) Int. Cl.
*H04L 27/26* (2006.01)
*H04B 7/08* (2006.01)
(Continued)

(52) U.S. Cl.
CPC ........... *H04B 7/0888* (2013.01); *H04B 7/024* (2013.01); *H04B 7/0452* (2013.01);
(Continued)

(58) Field of Classification Search
CPC ..... H04B 7/0888; H04B 7/024; H04B 17/309
See application file for complete search history.

(56) References Cited

U.S. PATENT DOCUMENTS 9,125,070 B2   9/2015 Kim et al.
9,356,809 B2   5/2016 Park et al.
(Continued)

FOREIGN PATENT DOCUMENTS

EP    2847957 A1    3/2015
WO    WO 2012/165904 A2    12/2012
(Continued)

OTHER PUBLICATIONS

Intel Corporation; "Discussion on RSRQ definition"; 3GPP TSG R4-136189; (Nov. 11-15, 2013); 7 pages; RAN WG4 Meeting #69, San Francisco, CA, US; Agenda 6.3.
(Continued)

*Primary Examiner* — Wei Zhao
(74) *Attorney, Agent, or Firm* — Thorpe North & Western

(57) ABSTRACT

A user equipment (UE) can process signals including a first synchronization signal (SS) and a second SS. The first SS and the second SS are beamformed with transmit beams and transmitted on subbands in a first set of symbols, for the first SS, and a second set of symbols, for the second SS. The UE can detect the first SS in the first set of symbols, and measure beam qualities of the transmit beams on the subbands in at least one of the first set of symbols or the second set of symbols. The UE can select one or more transmit beams and corresponding one or more subbands based on the measured beam qualities. The UE can detect the second SS on the
(Continued)

selected subbands in the second set of symbol, and each of subbands in the first and second sets of symbols is associated with a transmit beam.

25 Claims, 13 Drawing Sheets

(51) Int. Cl.
| | | |
|---|---|---|
| *H04B 7/024* | (2017.01) | |
| *H04B 7/06* | (2006.01) | |
| *H04B 17/309* | (2015.01) | |
| *H04B 7/0452* | (2017.01) | |
| *H04J 11/00* | (2006.01) | |

(52) U.S. Cl.
CPC ......... *H04B 7/0617* (2013.01); *H04B 7/0695* (2013.01); *H04B 7/0697* (2013.01); *H04B 17/309* (2015.01); *H04J 11/0073* (2013.01); *H04J 11/0076* (2013.01); *H04L 27/261* (2013.01)

(56) References Cited

U.S. PATENT DOCUMENTS

| | | |
|---|---|---|
| 2013/0156120 A1 | 6/2013 | Josiam et al. |
| 2013/0170435 A1* | 7/2013 | Dinan ................. H04L 45/50 370/328 |
| 2013/0258972 A1 | 10/2013 | Kim et al. |
| 2014/0321563 A1 | 10/2014 | Park et al. |
| 2016/0381596 A1* | 12/2016 | Hu .................... H04B 7/0617 370/236 |
| 2017/0164263 A1* | 6/2017 | Lindoff ................ H04W 40/12 |

FOREIGN PATENT DOCUMENTS

| | | |
|---|---|---|
| WO | WO 2013/169055 A1 | 11/2013 |
| WO | WO 2014/116090 A1 | 7/2014 |
| WO | WO 2014/126519 A1 | 8/2014 |
| WO | WO 2015/080645 A1 | 6/2015 |
| WO | WO 2016/182529 A1 | 11/2016 |

OTHER PUBLICATIONS

Qualcomm Incorporated; "Techniques to Cope with High Interference in Heterogeneous Networks"; 3GPP TSG R1-100702; (Jan. 18-22, 2009); 5 pages; RAN WG1 #59bis, Valencia, Spain; Agenda 8.2.3.

International Search Report dated Dec. 4, 2016, in International Application No. PCT/US2015/000425, filed Dec. 24, 2015; 3 pages.

* cited by examiner

NETWORK DISCOVERY AND BEAM ACQUISITION IN 5G RAT BEAM CELL OPERATION

BACKGROUND

Wireless mobile communication technology uses various standards and protocols to transmit data between a node (e.g., a transmission station) and a wireless device (e.g., a mobile device). Some wireless devices communicate using orthogonal frequency-division multiple access (OFDMA) in a downlink (DL) transmission and single carrier frequency division multiple access (SC-FDMA) in an uplink (UL) transmission. Standards and protocols that use orthogonal frequency-division multiplexing (OFDM) for signal transmission include the third generation partnership project (3GPP) long term evolution (LTE), the Institute of Electrical and Electronics Engineers (IEEE) 802.16 standard (e.g., 802.16e, 802.16m), which is commonly known to industry groups as WiMAX (Worldwide interoperability for Microwave Access), and the IEEE 802.11 standard, which is commonly known to industry groups as WiFi. In 3GPP radio access network (RAN) LTE systems, the node can be a combination of Evolved Universal Terrestrial Radio Access Network (E-UTRAN) Node Bs (also commonly denoted as evolved Node Bs, enhanced Node Bs, eNodeBs, or eNBs) and Radio Network Controllers (RNCs), which communicates with the wireless device, known as a user equipment (UE). The downlink (DL) transmission can be a communication from the node (e.g., eNodeB) to the wireless device (e.g., UE), and the uplink (UL) transmission can be a communication from the wireless device to the node.

Next generation of cellular standard, long-term evolution, advanced (LTE-A), have adopted many capacity-enhancing technologies, including coordinated multi-point transmission/reception (CoMP), multi-user multi-input multi-output (MU-MIMO), and heterogeneous networks (HetNet) to improve wireless network discover, cell capacity and reduce interference.

For example, interference is a major source of performance degradation in cellular systems. Massive MIMO using very large antenna arrays is used to substantially reduce interference and increase throughput. In the massive MIMO technique, a base station equipped with a specified number, such as, for example, a few hundred, transmit antennas transmits data to a plurality of mobile stations with a multi-user MIMO scheme. Higher number of antenna elements in a closely spaced antenna configuration enhances angular and spatial resolution by producing narrow and directive beams, thereby mitigating the interference. Coordinated Multi-Point (CoMP) is another technique to combat interference particularly for cell-edge cellular users wherein interfering transmitting points cooperate to boost average and cell-edge throughputs.

The Massive MIMO systems, having a large number of antennas, can increase spectral efficiency by potentially reducing the interference and enabling more number of users to be spatially multiplexed. However, despite using beamforming to enable operation in mid-to-high frequency bands, channel blockage is a current challenge for mid-to-high frequency bands thereby reducing efficiency and the ability to support seamless mobility.

BRIEF DESCRIPTION OF THE DRAWINGS

Features and advantages of the disclosure will be apparent from the detailed description which follows, taken in conjunction with the accompanying drawings, which together illustrate, by way of example, features of the disclosure; and, wherein.

Figure 1:
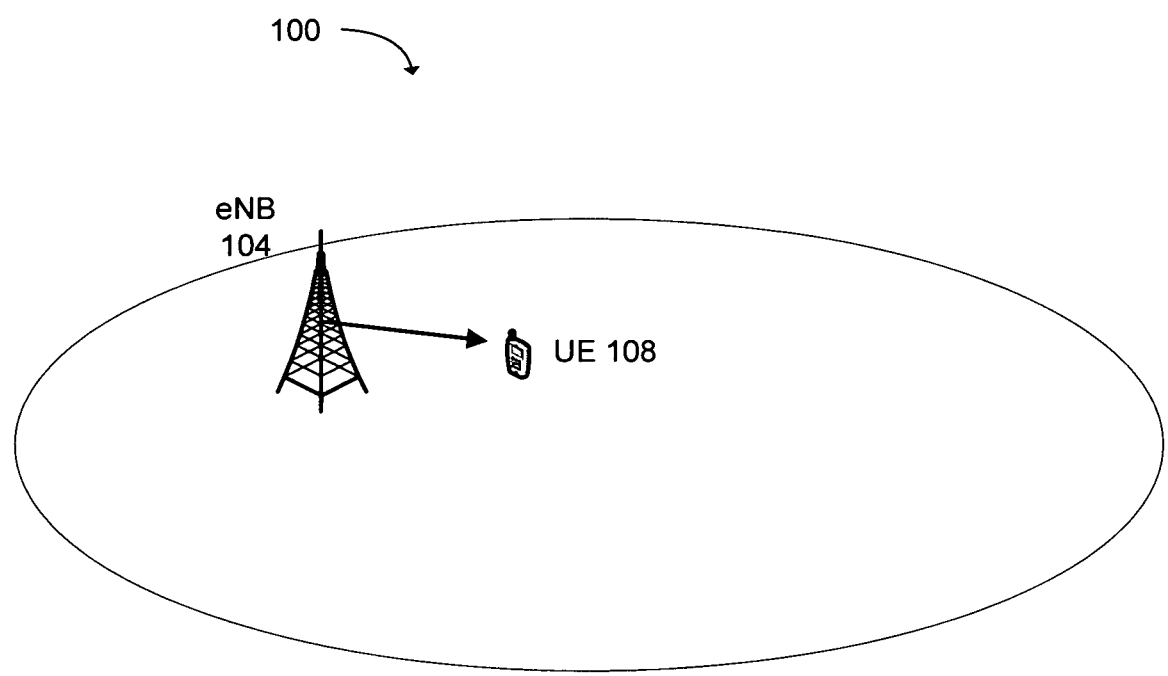
FIG. 1 illustrates a mobile communication network within a cell in accordance with an example.

Reference will now be made to the exemplary embodiments illustrated, and specific language will be used herein to describe the same. It will nevertheless be understood that no limitation of the scope of the technology is thereby intended.

DETAILED DESCRIPTION

Before the present technology is disclosed and described, it is to be understood that this technology is not limited to the particular structures, process steps, or materials disclosed herein, but is extended to equivalents thereof as would be recognized by those ordinarily skilled in the relevant arts. It should also be understood that terminology employed herein is used for the purpose of describing particular examples only and is not intended to be limiting. The same reference numerals in different drawings represent the same element. Numbers provided in flow charts and processes are provided for clarity in illustrating steps and operations and do not necessarily indicate a particular order or sequence.

Example Embodiments

An initial overview of technology embodiments is provided below and then specific technology embodiments are described in further detail later. This initial summary is intended to aid readers in understanding the technology more quickly but is not intended to identify key features or essential features of the technology nor is it intended to limit the scope of the claimed subject matter.

It is necessary to develop a system framework for a beam cell operation, which is applicable to low-to-mid-to-high frequency bands and time division duplex (TDD) and frequency division duplex (FDD) systems. Thus, the present technology provides a solution for network discovery and beam acquisition in a radio access technology that operate in cellular bands and frequency bands capable of exploiting advanced MIMO (e.g. massive MIMO) and CoMP transmission schemes in order to provide high area traffic capacity and consistent user experience.

In one aspect, a 3GPP radio access network (RAN) LTE system can include an evolved universal terrestrial radio access network (E-UTRAN), which can include a plurality of evolved Node-Bs (eNBs) and communicate with a plurality of mobile stations, also referred as user equipment (UEs). The radio protocol stacks of E-UTRAN are include a radio resource control layer (RRC), a packet data convergence protocol layer (PDCP), a radio link control layer (RLC), a media access control layer (MAC), and a physical layer (PHY).

In one aspect, a radio access technology (RAT) may be operated in both cellular bands and frequency bands above 6 GHz to exploit advanced multi-input multi-output (e.g. massive MIMO) and Cooperative Multi-point (CoMP) transmission schemes to provide high area traffic capacity and consistent user experience. Narrow beam based system operation (referred to as "beam cell") with a large number of antennas can increase spectral efficiency by reducing the interference and enabling more number of users to be spatially multiplexed. Furthermore, dynamic transmission (Tx) and reception (Rx) point switching and dynamic multi-point beam aggregation in CoMP can be used to overcome channel blockage in mid/high frequency bands and naturally support seamless mobility.

In one aspect, in beam cell operation, each access point (AP) can create multiple beam patterns to provide defined network coverage, and a UE can acquire each of the beams during a network discovery phase, especially for mid-to-high frequency band operations. In LTE or LTE-Advanced (LTE-A) systems, a transmission structure of primary and secondary synchronization signals (PSS/SSS) does not allow a UE to acquire multiple DL Tx beams from one or more APs associated with one cell ID, within one PSS/SSS instance. Thus, in one aspect, an embodiment of the present technology provides a system network discovery and downlink transmit (Tx) and receive (Rx) beam acquisition and a related UE receiver implementation to support fifth generation (5G) RAT beam cell operation. In one aspect, a system framework for beam cell operation, which is applicable to low/mid/high frequency bands and time division duplex (TDD) and frequency division duplex (FDD) systems is disclosed.

In one aspect, each access point (e.g., each base station), can create multiple beams. The multiple beams form network discovery signals or synchronization signals (SS) that can be transmitted towards the UE. The UE can attempt to detect as many of the multiple beams as possible and acquire those detected multiple beams on different TDD and/or FDD resources. The UE can acquire the cell identification (ID) by detecting the PSS/SSS sequence and acquire the beam identification (ID) for the PSS/SSS sequence indicated by the TDD/FDD resources.

In other words, the can UE perform symbol-level timing acquisition and downlink transmission (DL Tx) beam acquisition by detecting a primary synchronization signal (PSS) sequence transmitted in different frequency subbands with different Tx beams. As secondary synchronization signals (SSS) and PSS beamformed with a particular DL Tx beam are transmitted on the same subband of adjacent PSS/SSS symbols, the UE can perform channel estimation on subbands where the acquired DL Tx beams are transmitted by exploiting the detected PSS, and can use the channel estimates for detecting SSS. Even when each AP of one or more APs associated with one cell ID has a limited number of RF chains, DL Tx beams from the different APs can be frequency multiplexed and the UE may be able to acquire multiple DL Tx beams from the one or more APs within one PSS/SSS instance.

In one aspect, a technology is provided for network discovery and beam acquisition in an advanced radio access technology beam cell operation. A user equipment (UE) can process signals, received from a base station, including a first synchronization signal (SS) and a second SS. The first SS and the second SS can be beamformed with transmit beams and transmitted on subbands in a first set of symbols, for the first SS, and a second set of symbols, for the second SS. The UE can detect the first SS in the first set of symbols, and measure beam qualities of the transmit beams on the subbands in at least one of the first set of symbols or the second set of symbols. The UE can select one or more transmit beams from the transmit beams and corresponding one or more subbands from the subbands, based on the measured beam qualities. The UE can detect the second SS on the selected one or more subbands in the second set of symbols, wherein each of the subbands in the first and second sets of symbols is associated with one of the transmit beams.

In one aspect, a user equipment (UE) can process signals, received from a base station, including a first synchronization signal (SS), wherein the first SS is beamformed with a plurality of transmit beams and transmitted on a plurality of subbands in a first set of symbols. The UE can measure beam qualities of each of the plurality of transmit beams on the plurality of subbands in the first set of symbols. The UE can identify, by the UE, a subset of one or more transmit beams from the plurality of transmit beams and a subset of one or more subbands from the plurality of subbands. The UE can identify a second SS on a second set of symbols in the subset of the one or more transmit beams on the subset of the one or more subbands, wherein a subband includes a subset of subcarriers from a plurality of subcarriers.

In an additional aspect, a UE can receive signals including a synchronization signal (SS) beamformed with a plurality of transmit beams and transmitted on a plurality of subbands in a set of symbols. The UE can detect the SS and measure beam qualities of the plurality of transmit beams on the plurality of subbands in the set of symbols. The UE can select one or more transmit beams from the plurality of transmit beams and corresponding one or more subbands from the plurality of subbands. The UE can identify a subset of the one or more transmit beams from the plurality of transmit beams and a subset of the one or more subbands from the plurality of subbands. The UE can identify a second SS on a second set of symbols in the subset of the one or more transmit beams on the subset of the one or more subbands.

FIG. 1 illustrates a mobile communication network within a cell 100 having an evolved node B (eNB) with a mobile device. FIG. 1 illustrates an eNB 104 that can be associated with an anchor cell, macro cell or primary cell. Also, the cell 100 can include a mobile device, such as, for example, a User Equipment (UE or UEs) 108 that can be in communication with the eNB 104. The eNB 104 can be a station that communicates with the UE 108 and can also be referred to as a base station, a node B, an access point, and the like. In one example, the eNB 104 can be a high transmission power eNB, such as a macro eNB, for coverage and connectivity. The eNB 104 can be responsible for mobility and can also be responsible for radio resource control (RRC) signaling. User equipment (UE or UEs) 108 can be supported by the macro eNB 104. The eNB 104 can provide communication coverage for a particular geographic area. In 3GPP, the term "cell" can refer to a particular geographic coverage area of eNB and/or an eNB subsystem serving the coverage area with an associated carrier frequency and a frequency bandwidth, depending on the context in which the term is used.

Figure 2:
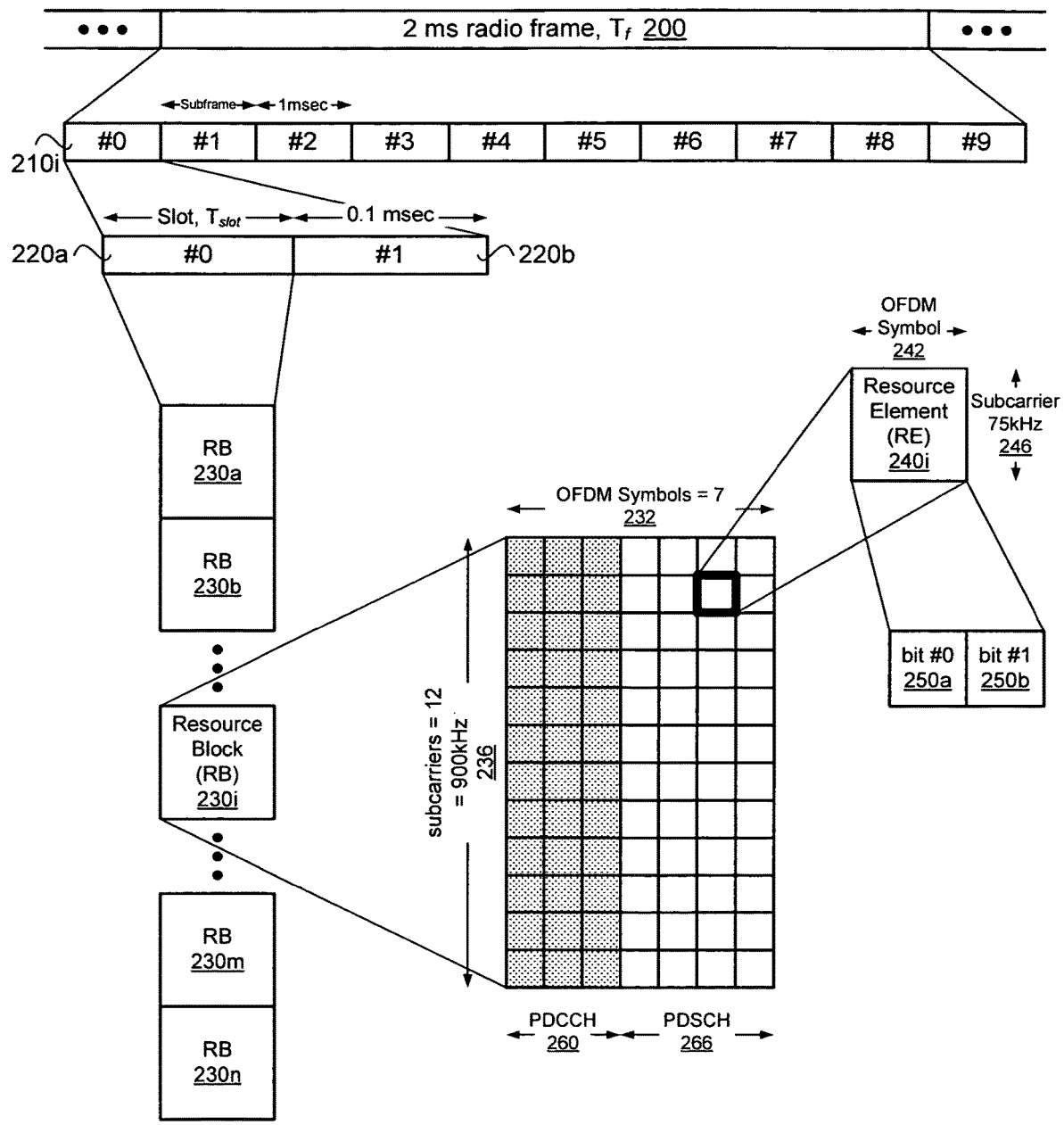
FIG. 2 illustrates a diagram of radio frame resources (e.g., a resource grid) for a downlink (DL) transmission including a physical downlink control channel (PDCCH) in accordance with an example.

FIG. 2 illustrates a diagram of radio frame resources (e.g., a resource grid) for a downlink (DL) transmission including a physical downlink control channel (PDCCH) in accordance with an example. In the example, a radio frame 200 of a signal used to transmit the data can be configured to have a duration, Tf, of 2 milliseconds (ms). Each radio frame can be segmented or divided into ten subframes 210i that are each 0.2 ms long. Each subframe can be further subdivided into two slots 220a and 220b, each with a duration, Tslot, of 0.1 ms. In one example, the first slot (#0) 220a can include a physical downlink control channel (PDCCH) 260 and/or a physical downlink shared channel (PDSCH) 266, and the second slot (#1) 220b can include data transmitted using the PDSCH.

Each slot for a component carrier (CC) used by the node and the wireless device can include multiple resource blocks (RBs) 230a, 230b, 230i, 230m, and 230n based on the CC frequency bandwidth. The CC can include a frequency bandwidth and a center frequency within the frequency bandwidth. In one example, a subframe of the CC can include downlink control information (DCI) found in the PDCCH. The PDCCH in the control region can include one to three columns of the first OFDM symbols in a subframe or physical RB (PRB), when a legacy PDCCH is used. The remaining 11 to 13 OFDM symbols (or 14 OFDM symbols, when legacy PDCCH is not used) in the subframe can be allocated to the PDSCH for data (for short or normal cyclic prefix).

Each RB (physical RB or PRB) 230i can include 12 subcarriers 236 of 75 kHz subcarrier spacing (on the frequency axis) and 6 or 7 orthogonal frequency-division multiplexing (OFDM) symbols 232 (on the time axis) per slot. The RB can use seven OFDM symbols if a short or normal cyclic prefix is employed. The RB can use six OFDM symbols if an extended cyclic prefix is used. The resource block can be mapped to 84 resource elements (REs) 240i using short or normal cyclic prefixing, or the resource block can be mapped to 72 REs (not shown) using extended cyclic prefixing. The RE can be a unit of one OFDM symbol 242 by one subcarrier (i.e., 75 kHz) 246.

Each RE can transmit two bits 250a and 250b of information in the case of quadrature phase-shift keying (QPSK) modulation. Other types of modulation can be used, such as 16 quadrature amplitude modulation (QAM) or 64 QAM to transmit a greater number of bits in each RE, or bi-phase shift keying (BPSK) modulation to transmit a lesser number of bits (a single bit) in each RE. The RB can be configured for a downlink transmission from the eNodeB to the UE, or the RB can be configured for an uplink transmission from the UE to the eNodeB.

Embodiments herein relate to system design for network discovery and downlink transmit (Tx) and receive (Rx) beam acquisition, and related UE receiver implementation. In one example, embodiments can be configured to support 5G RAT beam cell operation. The UE can perform symbol-level timing acquisition and DL Tx beam acquisition by detecting a PSS sequence transmitted in different frequency subbands with different Tx beams. Here, a frequency subband refers to a subset of subcarriers out of all available subcarriers in a system, and may comprise a set of contiguous subcarriers (a localized subband) or a set of equally spaced subcarriers (a distributed subband). As SSS and PSS beamformed with a particular DL Tx beam are transmitted on the same subband of adjacent PSS/SSS symbols, the UE can perform channel estimation on subbands where the acquired DL Tx beams are transmitted by exploiting the detected PSS, and can use the channel estimates for detecting SSS. Even when each AP of one or more APs associated with one cell ID has a limited number of RF chains, DL Tx beams from the different APs can be frequency multiplexed and the UE may be able to acquire multiple DL Tx beams from the one or more APs within one PSS/SSS instance.

In one aspect, as compared to the legacy LTE design, the present technology allows the UE to detect and measure a large number of DL Tx beams within one PSS/SSS instance during a cell discovery phase. If an AP has a greater number of antennas (and radio frequency "RF" chains) and higher transmit power than a UE, embodiments can achieve extended coverage and lower system detection latency compared to omni-directional transmission of PSS with UE receive beamforming in PSS detection. For example, Table 1 depicts an expected coverage and latency for various PSS transmission schemes [e.g., PSS transmission scheme (1), (2), (3), and (4)] for a system with 75 kilohertz subcarrier spacing (e.g., a distance between subcarrier spacing is 75 KHz) and 100 MHz system bandwidth in 28 GHz non-line-of-sight (NLOS) channels. For example, the PSS transmission scheme (4), which has beamformed transmission (BF-Tx) and omni-directional reception (omni-Rx) on 16 subbands over 2 symbols, has a shorter PSS transmission time and wider coverage than the PSS transmission scheme (2) of omni-Tx and BF-Rx on 1 subband. PSS transmission scheme (3) of BF-Tx and BF-Rx on 16 subbands can further increase the coverage by employing time-domain repetition of Tx beamformed PSS.

TABLE 1

Coverage and latency analysis for different PSS transmission schemes (75 KHz subcarrier spacing, 100 MHz system bandwidth, 28 GHz NLOS channel)

| Tx/Rx details | PSS scheme omni Tx, omni Rx on 1 | PSS scheme omni Tx, BF Rx on 1 subband | PSS scheme (3) BF Tx, BF Rx on 16 subbands | PSS scheme (4) BF Tx, omni Rx on 16 subbands |
|---|---|---|---|---|
| BS Transmitter | | | | |
| (1) Total transmit power dBm) | 29 | 29 | 29 | 29 |
| (2) Transmitter beamforming gain (dB) | 0 | 0 | 21 | 21 |
| (3) EIRP = (1) + (2) (dBm) | 29 | 29 | 50 | 50 |

TABLE 1-continued

Coverage and latency analysis for different PSS transmission schemes (75 KHz subcarrier spacing, 100 MHz system bandwidth, 28 GHz NLOS channel)

| Tx/Rx details | PSS scheme omni Tx, omni Rx on 1 | PSS scheme omni Tx, BF Rx on 1 subband | PSS scheme (3) BF Tx, BF Rx on 16 subbands | PSS scheme (4) BF Tx, omni Rx on 16 subbands |
|---|---|---|---|---|
| UE Receiver | | | | |
| (4) Receiver beamforming gain (dB) | 0 | 6 | 6 | 0 |
| (5) Receiver noise figure (dB) | 7 | 7 | 7 | 7 |
| (6) Thermal noise density (dBm/Hz) | −174 | −174 | −174 | −174 |
| (7) Total noise power (dBm) | −100.33 | −100.33 | −88.28 | −88.28 |
| (8) Receiver implementation margin | 3 | 3 | 3 | 3 |
| (9) Required SNR (dB) for NLOS | −3.7 | −3.7 | −3.7 | −3.7 |
| (10) Receiver sensitivity (dBm) = (7) + (8) + (9) Channel at 28 GHz | −101.03 | −101.03 | −88.98 | −88.98 |
| (11) Shadow fading margin (dB) | 7 | 7 | 7 | 7 |
| (12) Penetration loss margin (dB) | 0 | 0 | 0 | 0 |
| (13) Max allowed pathloss (dB) = (3) + (4) − (10) − (11) − (12) | 123.03 | 129.03 | 137.98 | 131.98 |
| Coverage (meter) | 64.94 | 97.5 | 178.85 | 119.13 |
| PSS transmission duration in symbol | 1 | 4 | 8 | 2 |

In one aspect, a pair of PSS and SSS sequences can be mapped to one or more cooperative APs. Beam identifications (IDs) for the one or more cooperative APs can be derived from allocated subbands of downlink transmission (DL Tx) beams within one PSS/SSS instance. As compared to systems where each DL Tx beam is associated with one SSS sequence, the present technology allows a given PSS/SSS sequence set to represent a greater number of beams, such as, for example, 32 beams per cell ID×168 (number of SSS sequences)×3 (number of PSS sequences)=16128 beams on 4 symbols (16 beams per symbol, 2 symbols for PSS and 2 symbols for SSS). In this way, detection failure can be avoided due to ambiguity in a dense deployment scenario.

In one aspect, as a UE performs SSS detection only on subbands for the acquired DL Tx beams, a large number of hypothesis tests (e.g. 168) for SSS detection can be performed only on a few selected subbands. Furthermore, coherent sequence detection, which exploits channel information obtained from the detected PSS sequence, can guarantee increased detection performance for SSS.

In one aspect, a new PSS/SSS transmission structures is provided to allow a UE to perform DL Tx beam acquisition and/or downlink reception (DL Rx) beam acquisition in addition to a cell identity detection and time/frequency synchronization as follows.

In one aspect, for fifth generation (5G) RAT, particularly for mid or high frequency bands, it can be assumed that a minimum system bandwidth is greater than 6 resource blocks (RB) of a 3GPP LTE Rel. 8 radio frame, with a larger subcarrier spacing, such as, for example, 50 or 100 RBs with 75 KHz subcarrier spacing.

In one aspect, there is no frequency-domain multiplexing of PSS and SSS within a symbol or with other transmissions, such as, a physical downlink shared channel (PDSCH). In one aspect, a first set of symbols can be dedicated to PSS transmission, and a second set of symbols can be dedicated to SSS transmission. For a stand-alone cell operation without assistance from an anchor cell or a primary cell, the first and second set of symbols can be pre-determined. In one aspect, the first and second set of symbols can be semi-statically configurable and be indicated via a macro-cell interface in macro-cell assisted operation. One or more APs, which can transmit one or more DL Tx beams, can be associated with a given pair of PSS and SSS sequences. The given pair of PSS and SSS sequences can be beamformed with the one or more DL Tx beams, and the PSS/SSS beamformed with different Tx beams can be mapped to different sub-bands within a pair of PSS/SSS symbols (e.g., frequency first mapping).

Additionally, if the one or more APs have a limited number of RF chains compared to the number of configured DL Tx beams, multiple pairs of PSS/SSS symbols can be configured. The PSS/SSS beamformed with different Tx beams can be transmitted on different pairs of PSS/SSS symbols. The pair of PSS and SSS sequences beamformed with the same Tx beam can be mapped to the same subband of a pair of PSS/SSS symbols to allow coherent detection of SSS.

After PSS detection, the UE can estimate a signal-to-interference and noise ratio (SINR), a reference signal received power (RSRP), and/or a reference signal received quality (RSRQ) for a detected Tx beam, and/or determines whether to select the corresponding Tx beam and subband for SSS detection. In another aspect, the UE can measure a received signal strength (RSS) on each sub-band in at least one of the PSS symbols or the SSS symbols, and select suitable Tx beams based on the measured RSS.

As for time and frequency synchronization, a UE does not assume that all acquired transmit Tx beams associated with the same cell ID are transmitted with the same time and frequency reference. For a detected cell ID, a UE can perform grouping of beams associated with the detected cell ID according to estimated time and/or frequency offset values, and combine measurements of the beams within the same group for further refinement of time/frequency offset estimation. For example, a UE can further refine time and frequency (e.g., a timing/frequency) offset estimation by averaging the estimated timing/frequency offset values within the group, non-coherently combining detection metrics of multiple beams within the group, and/or taking a weighted average of an estimated time/frequency offset values within the group, wherein weights are based on RSRP, SINR, RSRQ, or RSS measurements. Alternatively, the UE can coherently combine measurements of multiple beams within the group based on channel estimates for the beams, and obtain refined time/frequency offset values, which optimizes a detection metric taking into account multiple measurements.

In one aspect, for a pre-determined or a configured number of symbols and symbol/subframe indices for PSS/SSS transmission, a network can flexibly configure beam width, the number of DL Tx beams for a specific cell ID, and corresponding subbands, depending on target coverage, operating bands, and AP antenna configurations.

Figure 3:
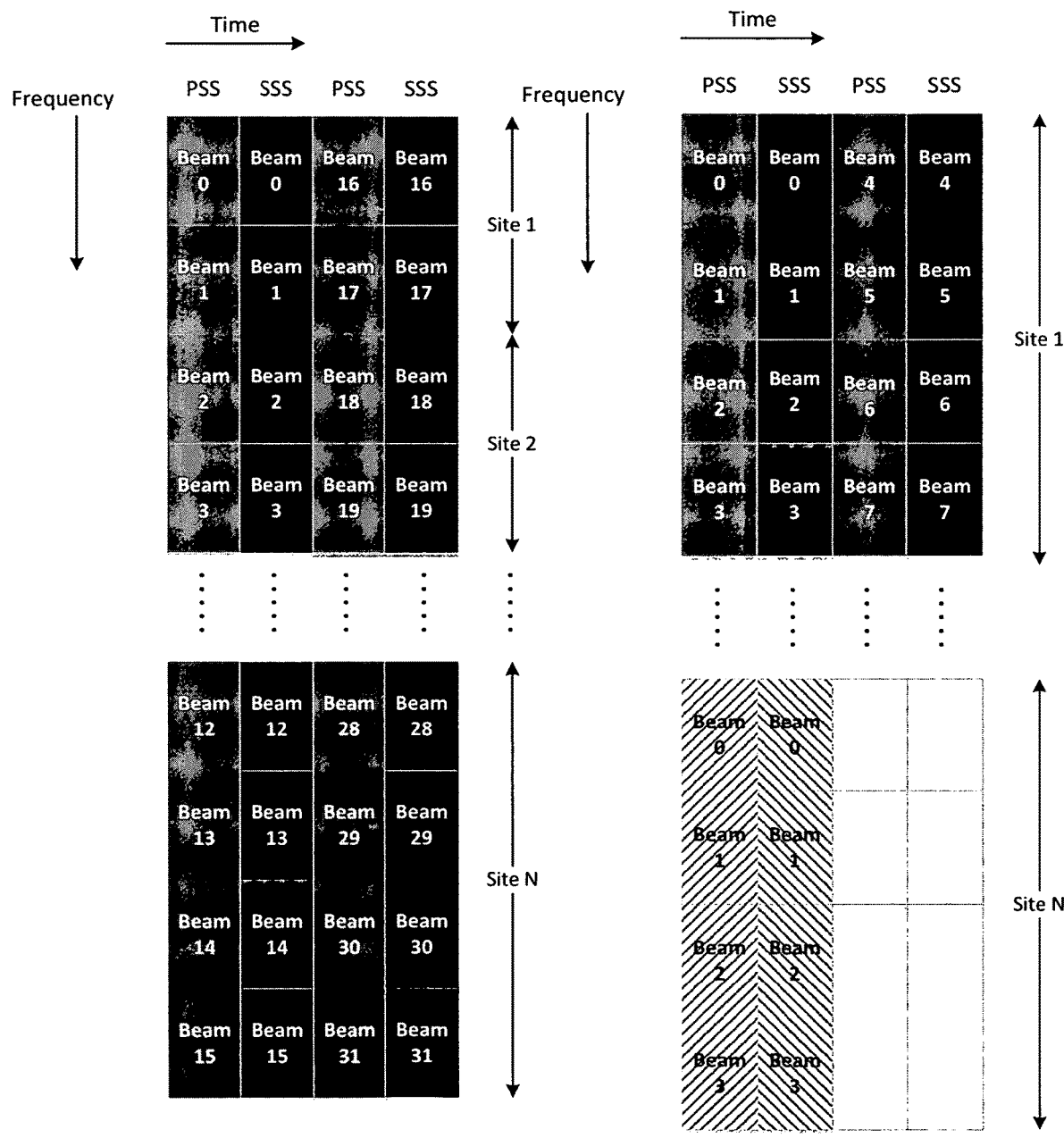
FIGS. 3a, 3b illustrates a multiplexing of multi-site cooperative beams in accordance with an example.

Turning now to FIGS. 3a, 3b, an example structure 300 multiplexing of multi-site cooperative beams is depicted. That is, FIGS. 3a and 3b depict examples for multiplexing of multi-site cooperative beams (e.g., beams 0-31). In one aspect, one PSS/SSS instance can consist of 2 PSS symbols and 2 SSS symbols. FIG. 3(a) depicts a scenario that the same cell ID (the same pair of PSS/SSS sequences) is assigned for N cooperative sites (or APs indicated in FIG. 3 as site 1, site 2, and site N), and all available beams for the N sites are indexed in a frequency first manner. FIG. 3 (b) illustrates that each cooperative site (e.g., site 1 and site N) has a distinctive cell ID (a different pair of PSS/SSS sequences), and beams for each site are indexed separately in a frequency first manner. The UE can detect as many of the multiple beams as possible and acquire those detected multiple beams on different TDD and/or FDD resources. The UE can acquire the cell identification (ID) by detecting the PSS/SSS sequence and acquire the beam identification (ID) for the PSS/SSS sequence indicated by the TDD/FDD resources.

It should be noted that in FIG. 3(a), similar color beams (light grey for the PSS and black for the SSS) form the PSS/SSS sequences having the same cell identification (ID). Also, different time and different frequency resources represent different beam IDs. In FIG. 3(B), site 1 uses one cell ID, and site N uses a different cell ID, indicated by use of the hatch marks in site N.

Figure 4:
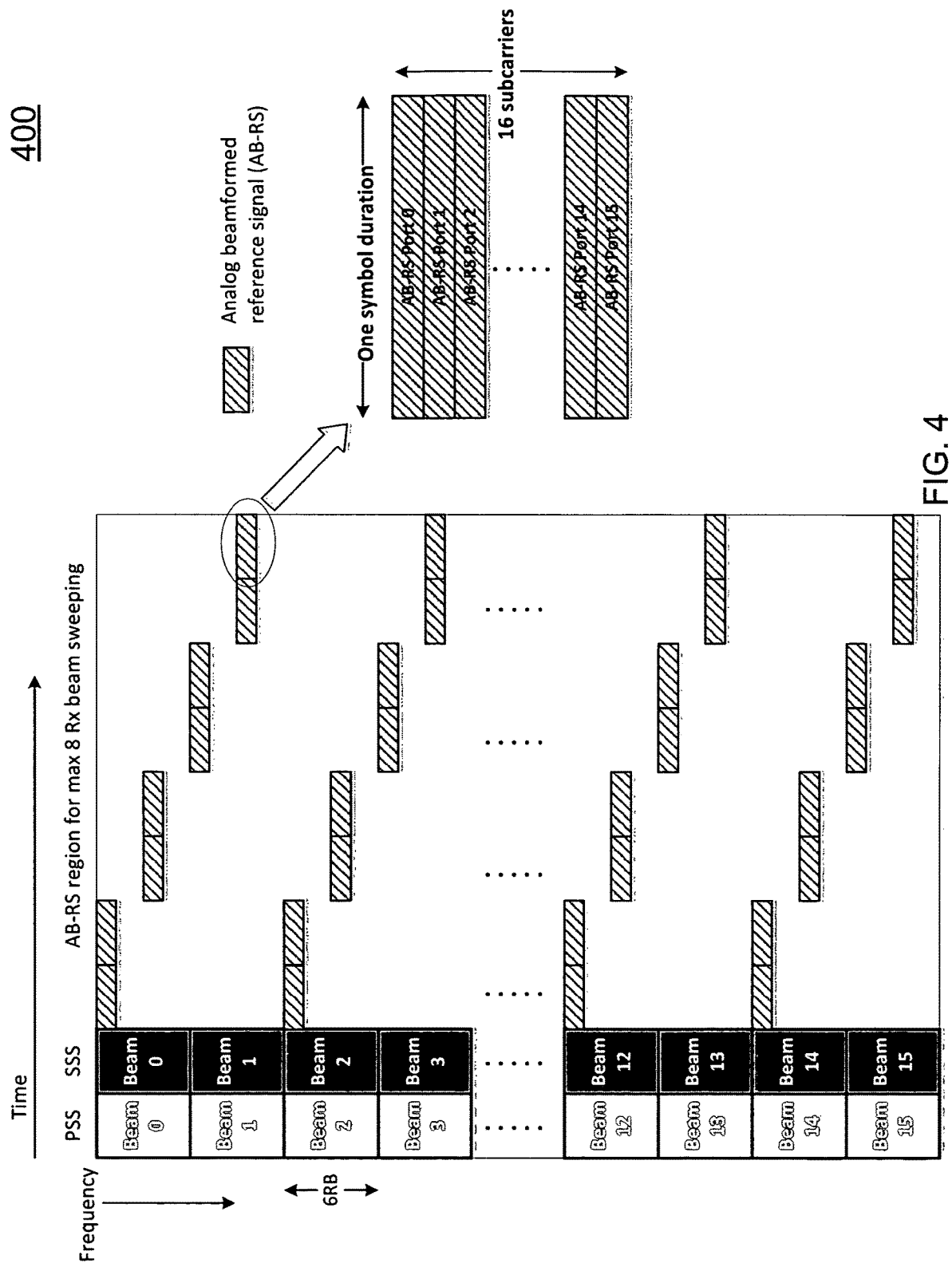
FIG. 4 illustrates analog beamformed reference signal (AB-RS) based downlink (DL) reception (Rx) beam acquisition in accordance with an example.

FIG. 4 illustrates an example structure 400 for PSS/SSS and analog beamformed reference signal (AB-RS) based downlink (DL) reception (Rx) beam acquisition. AB-RS can also be referred to as "beam reference signal" (BRS). An AB-RS antenna port can have a one-to-one mapping relationship with a beam index. The UE can perform a wideband beam measurement and DL Rx beam scanning using the AB-RS. In FIG. 4, the AB-RS with 16 antenna ports can be transmitted in every 144 subcarriers of a symbol. The AB-RS, for a maximum of 9 distinctive cell IDs (e.g., a total of 144 beams), can be transmitted in each symbol.

Figure 5:
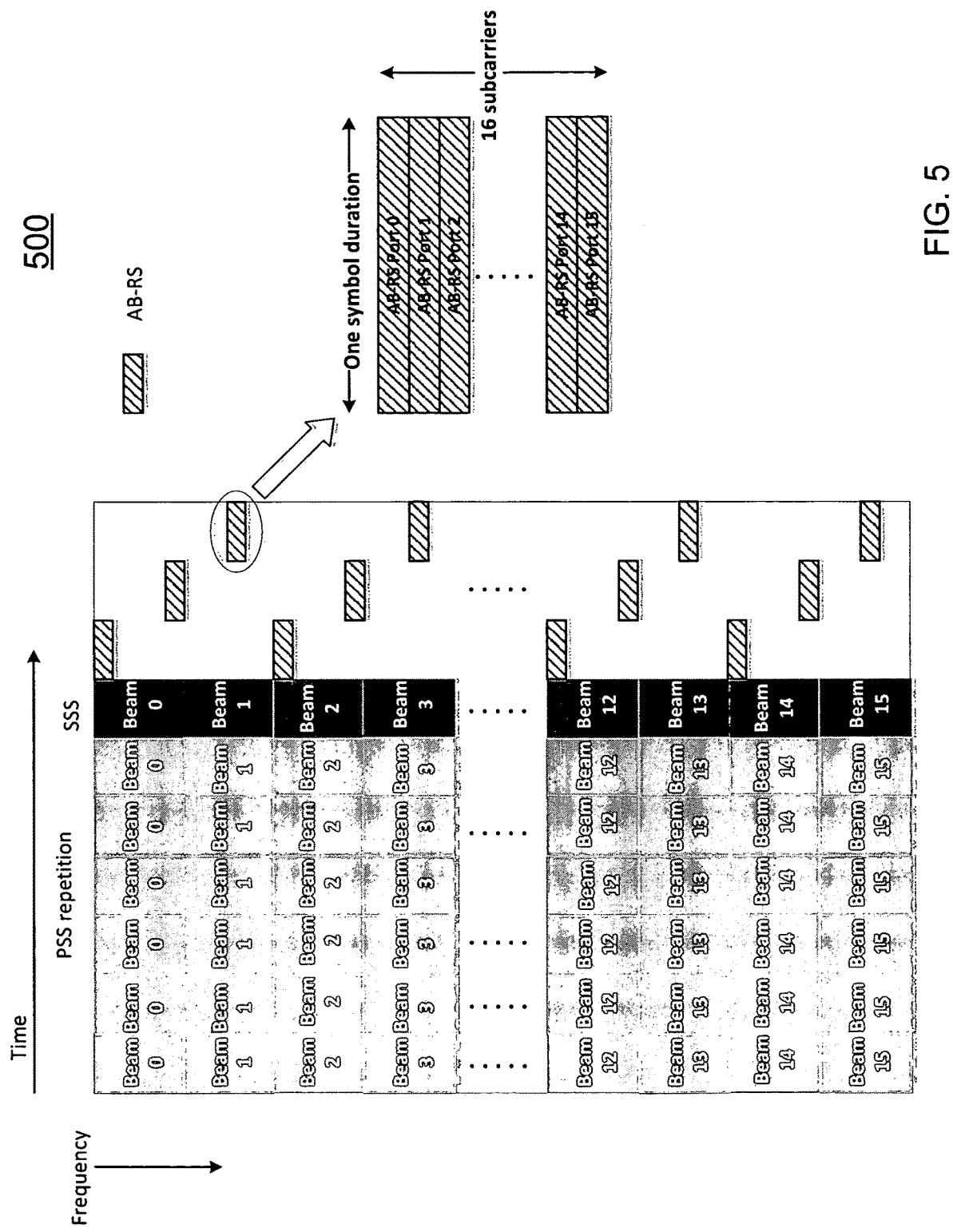
FIG. 5 illustrates a primary synchronized signal (PSS) based downlink (DL) reception (Rx) beam acquisition in accordance with an example.

FIG. 5 illustrates an example structure 500 for PSS and AB-RS based downlink (DL) reception (Rx) beam search. That is, FIG. 5 depicts an additional example transmission structure 500 for beam acquisition and measurement. In FIG. 5, a UE can perform hierarchical DL Rx beam search. For example, the UE can first scan 6 sectors based on repeated PSS and then scan 3 beams for a selected sector based on AB-RS. In transmission structure 500, a coarse DL Rx beamforming gain is exploited for PSS/SSS detection.

Figure 6:
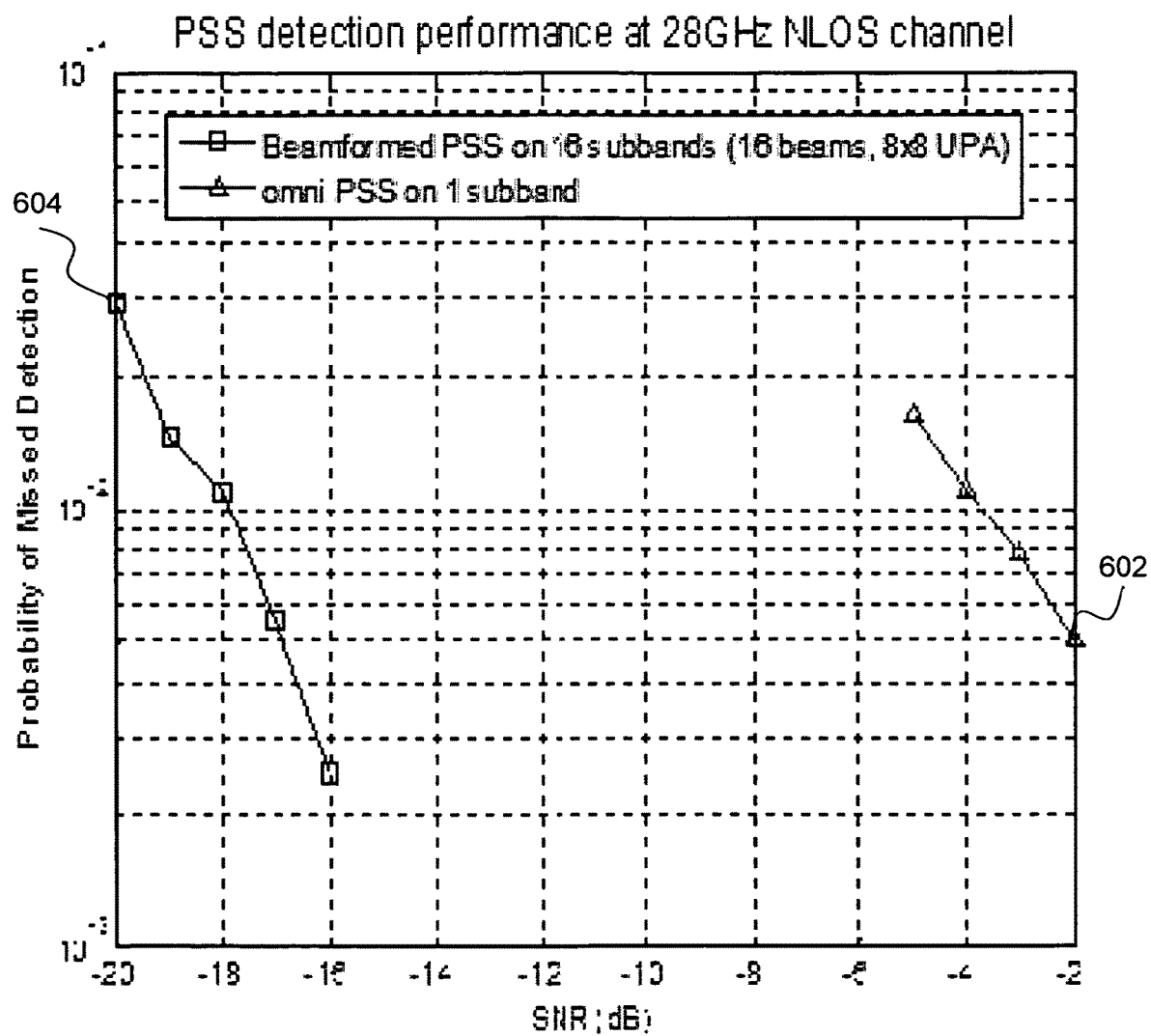
FIG. 6 illustrates a graph of detection performance of omni-directionally transmitted PSS and beamformed primary synchronized signal (PSS) in accordance with an example.

FIG. 6 illustrates a graph 600 of detection performance of omni-directionally transmitted PSS and beamformed primary synchronized signal (PSS). The plots in graph 600 represent probabilities of missed detection for PSS omni-directionally transmitted on 1 localized subband (602) and for PSS beamformed with 16 beams and transmitted on 16 localized subbands (604), where 16 Tx beams were constructed from 8×8 uniform planar array (UPA) antennas, in 28 GHz channels. The plots show that approximately 14 dB gain from analog beamforming and frequency diversity of 16 subbands is achieved with beamformed PSS transmission on different subbands within a symbol.

Figure 7:
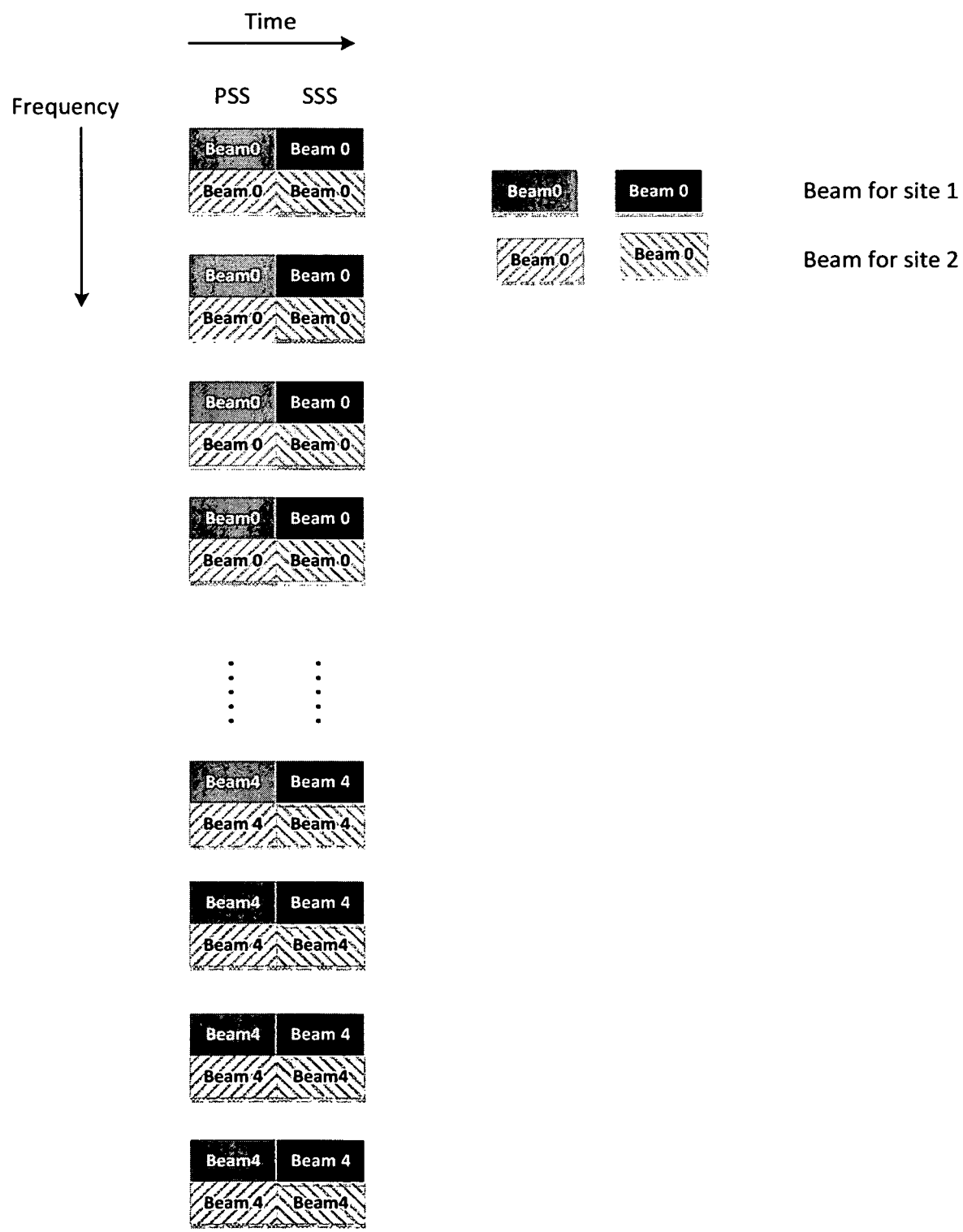
FIG. 7 illustrates multiplexing of multi-site cooperative beams with distributed subbands in accordance with an example.

FIG. 7 illustrates an example structure 700 multiplexing of multi-site cooperative beams with distributed subbands.

In one example, each of the distributed subbands includes a subset of subcarriers wherein a frequency distance between two adjacent subcarriers in the subset of subcarriers is 300 KHz, that is, 4 subcarrier spacings.

In macro-cell assisted beam cell operation, a macro cell can signal a set of candidate cell IDs, synchronization signal (SS) sequence indices associated with the signaled candidate cell IDs, and radio resources (e.g. symbol/subframe/frame indices) for SS transmission to the UE. The UE can derive frame and subframe timing of beam cells from the macro cell frame/subframe timing information. One synchronization signal for symbol-level timing acquisition can be sufficient. Thus, the signaled candidate cell ID is associated with one synchronization sequence, instead of a pair of PSS and SSS sequences, and SS can be beamformed with different Tx beams and transmitted on different subbands.

Figure 8:
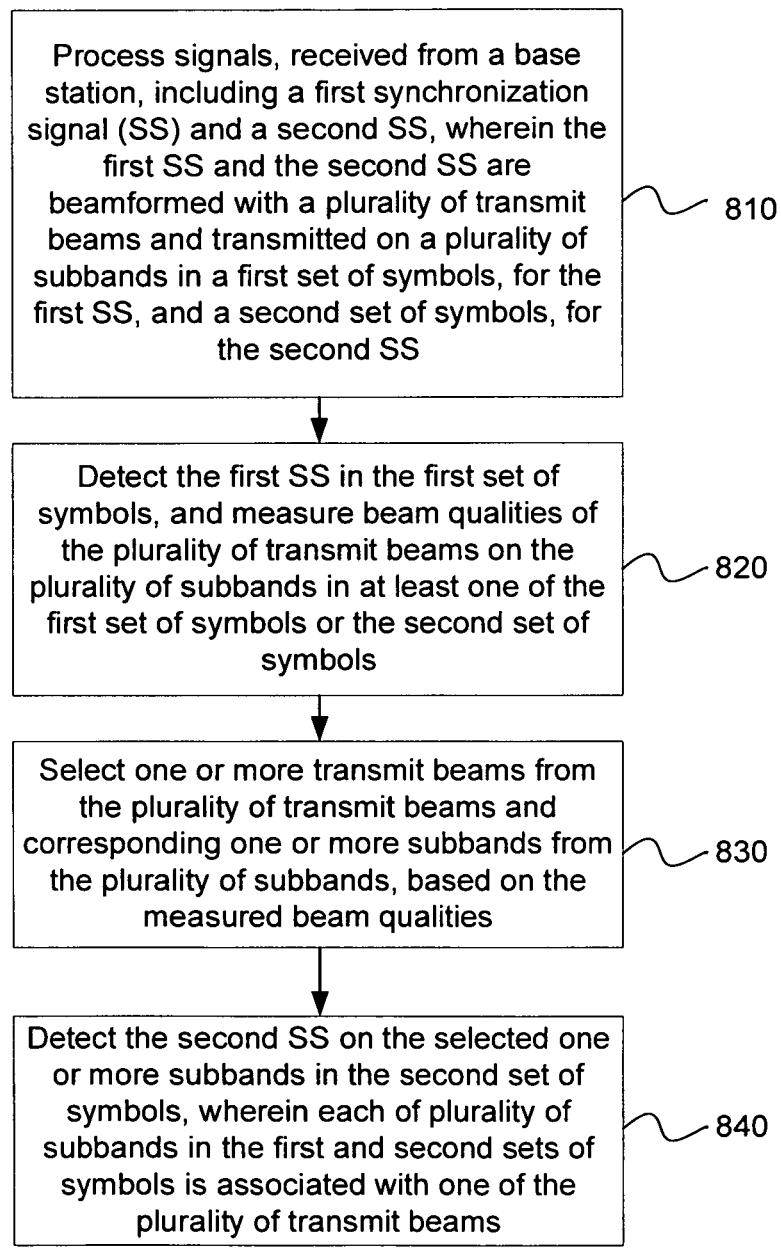
FIG. 8 depicts functionality of a user equipment (UE) operable to perform network discovery and beam acquisition in accordance with an example.

FIG. 8 depicts functionality 800 of a user equipment (UE) operable to perform network discovery and beam acquisition. The functionality 800 can be implemented as a method or the functionality 800 can be executed as instructions on a machine, where the instructions are included on one or more computer readable mediums or one or more non-transitory machine readable storage mediums. One or more processors and memory can be configured to process signals, received from a base station, including a first synchronization signal (SS) and a second SS, wherein the first SS and the second SS are beamformed with a plurality of transmit beams and transmitted on a plurality of subbands in a first set of symbols, for the first SS, and a second set of symbols, for the second SS, as in block 810. One or more processors and memory can be configured to detect the first SS in the first set of symbols, and measure beam qualities of the plurality of transmit beams on the plurality of subbands in at least one of the first set of symbols or the second set of symbols, as in block 820. One or more processors and memory can be configured to select one or more transmit beams from the plurality of transmit beams and corresponding one or more subbands from the plurality of subbands, based on the measured beam qualities, as in block 830. One or more processors and memory can be configured to detect the second SS on the selected one or more subbands in the second set of symbols, wherein each of subbands in the first and second sets of symbols is associated with one of the plurality of transmit beams, as in block 840.

Figure 9:
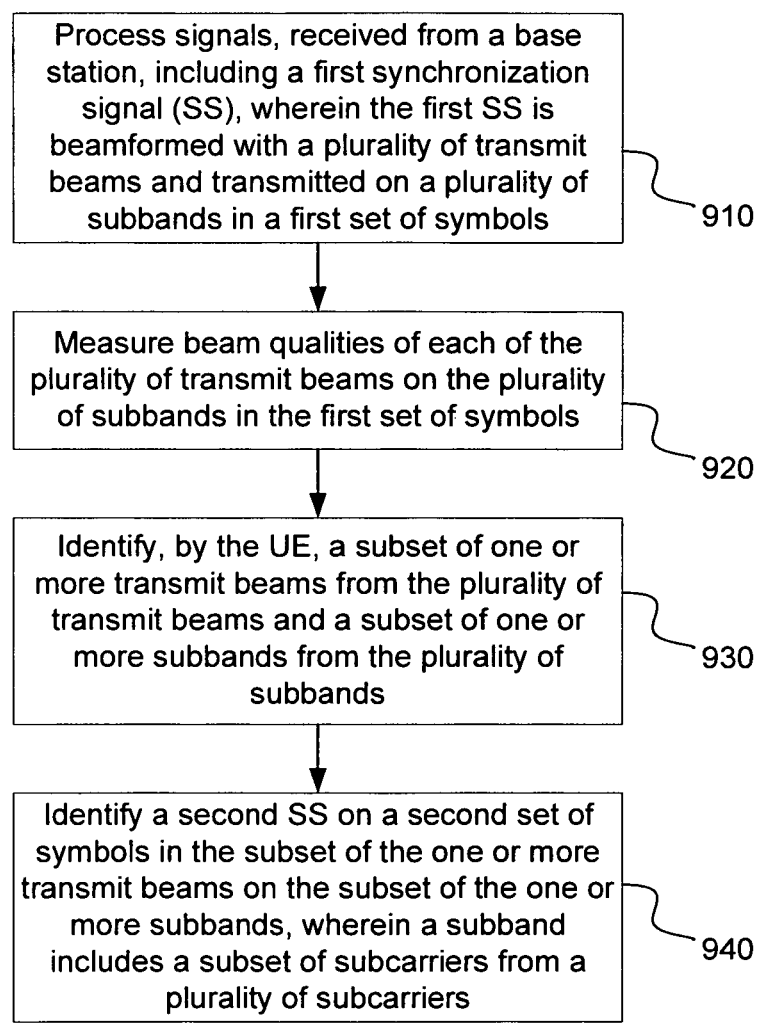
FIG. 9 depicts additional functionality of a user equipment (UE) operable to perform network discovery and beam acquisition in accordance with an example.

FIG. 9 depicts functionality 900 of a user equipment (UE) operable to perform network discovery and beam acquisition. The functionality 900 can be implemented as a method or the functionality 900 can be executed as instructions on a machine, where the instructions are included on one or more computer readable mediums or one or more non-transitory machine readable storage mediums. One or more processors and memory can be configured to process signals, received from a base station, including a first synchronization signal (SS), wherein the first SS is beamformed with a plurality of transmit beams and transmitted on a plurality of subbands in a first set of symbols, as in block 910. One or more processors and memory can be configured to measure beam qualities of each of the plurality of transmit beams on the plurality of subbands in the first set of symbols, as in block 920. One or more processors and memory can be configured to identify, by the UE, a subset of one or more transmit beams from the plurality of transmit beams and a subset of one or more subbands from the plurality of subbands, as in block 930. One or more processors and memory can be configured to identify a second SS on a second set of symbols in the subset of the one or more transmit beams on the subset of one or more subbands, wherein a subband includes a subset of subcarriers from a plurality of subcarriers, as in block 940.

Figure 10:
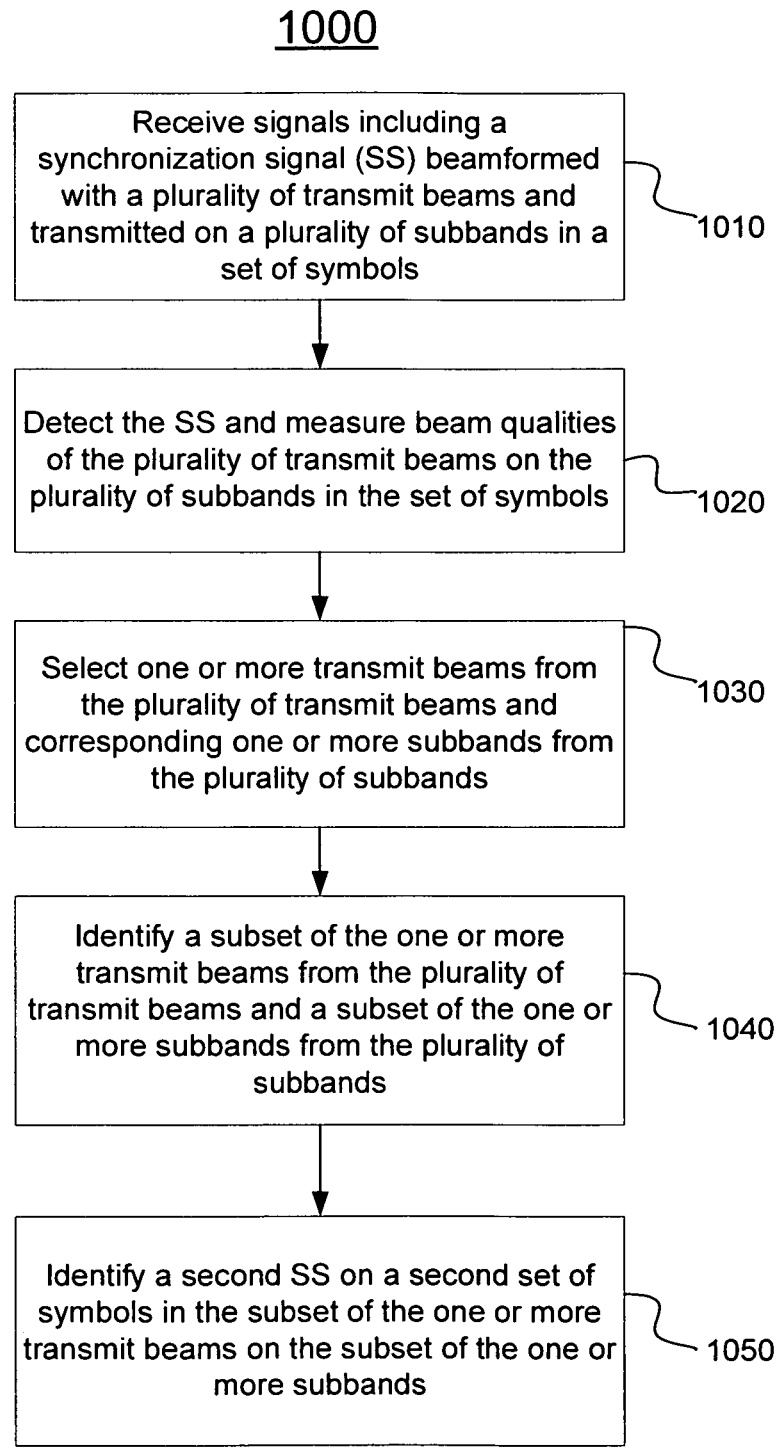
FIG. 10 depicts functionality of a user equipment (UE) operable to perform network discovery and beam acquisition in accordance with an example.

FIG. 10 depicts functionality 1000 of a user equipment (UE) operable to perform network discovery and beam acquisition. The functionality 1000 can be implemented as a method or the functionality 1000 can be executed as instructions on a machine, where the instructions are included on one or more computer readable mediums or one or more non-transitory machine readable storage mediums. One or more processors and memory can be configured to receive signals including a synchronization signal (SS) beamformed with a plurality of transmit beams and transmitted on a plurality of subbands in a set of symbols, as in block 1010. One or more processors and memory can be configured to detect the SS and measure beam qualities of the plurality of transmit beams on the plurality of subbands in the set of symbols, as in block 1020. One or more processors and memory can be configured to select one or more transmit beams from the plurality of transmit beams and corresponding one or more subbands from the plurality of subbands, as in block 1030. One or more processors and memory can be configured to identify a subset of the one or more transmit beams from the plurality of transmit beams and a subset of the one or more subbands from the plurality of subbands, as in block 1040. One or more processors and memory can be configured to identify a second SS on a second set of symbols in the subset of the one or more transmit beams on the subset of the one or more subbands, as in block 1050.

Figure 11:
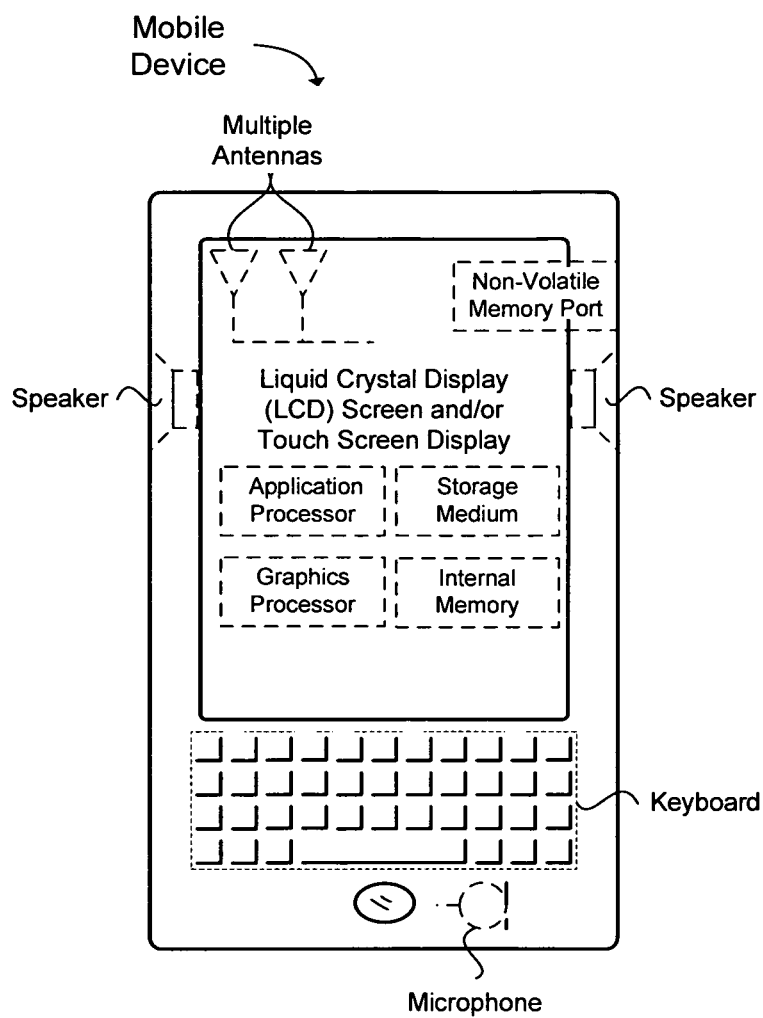
FIG. 11 illustrates a diagram of a wireless device (e.g., UE) in accordance with an example.

FIG. 11 illustrates a diagram of a wireless device (e.g., UE) in accordance with an example. FIG. 11 provides an example illustration of the wireless device, such as a user equipment (UE), a mobile station (MS), a mobile wireless device, a mobile communication device, a tablet, a handset, or other type of wireless device. In one aspect, the wireless device can include at least one of an antenna, a touch sensitive display screen, a speaker, a microphone, a graphics processor, a baseband processor, an application processor, internal memory, a non-volatile memory port, and combinations thereof.

The wireless device can include one or more antennas configured to communicate with a node or transmission station, such as a base station (BS), an evolved Node B (eNB), a baseband unit (BBU), a remote radio head (RRH), a remote radio equipment (RRE), a relay station (RS), a radio equipment (RE), a remote radio unit (RRU), a central processing module (CPM), or other type of wireless wide area network (WWAN) access point. The wireless device can be configured to communicate using at least one wireless communication standard including 3GPP LTE, WiMAX, High Speed Packet Access (HSPA), Bluetooth, and WiFi. The wireless device can communicate using separate antennas for each wireless communication standard or shared antennas for multiple wireless communication standards. The wireless device can communicate in a wireless local area network (WLAN), a wireless personal area network (WPAN), and/or a WWAN. The mobile device can include a storage medium. In one aspect, the storage medium can be associated with and/or communication with the application processor, the graphics processor, the display, the non-volatile memory port, and/or internal memory. In one aspect, the application processor and graphics processor are storage mediums.

Figure 12:
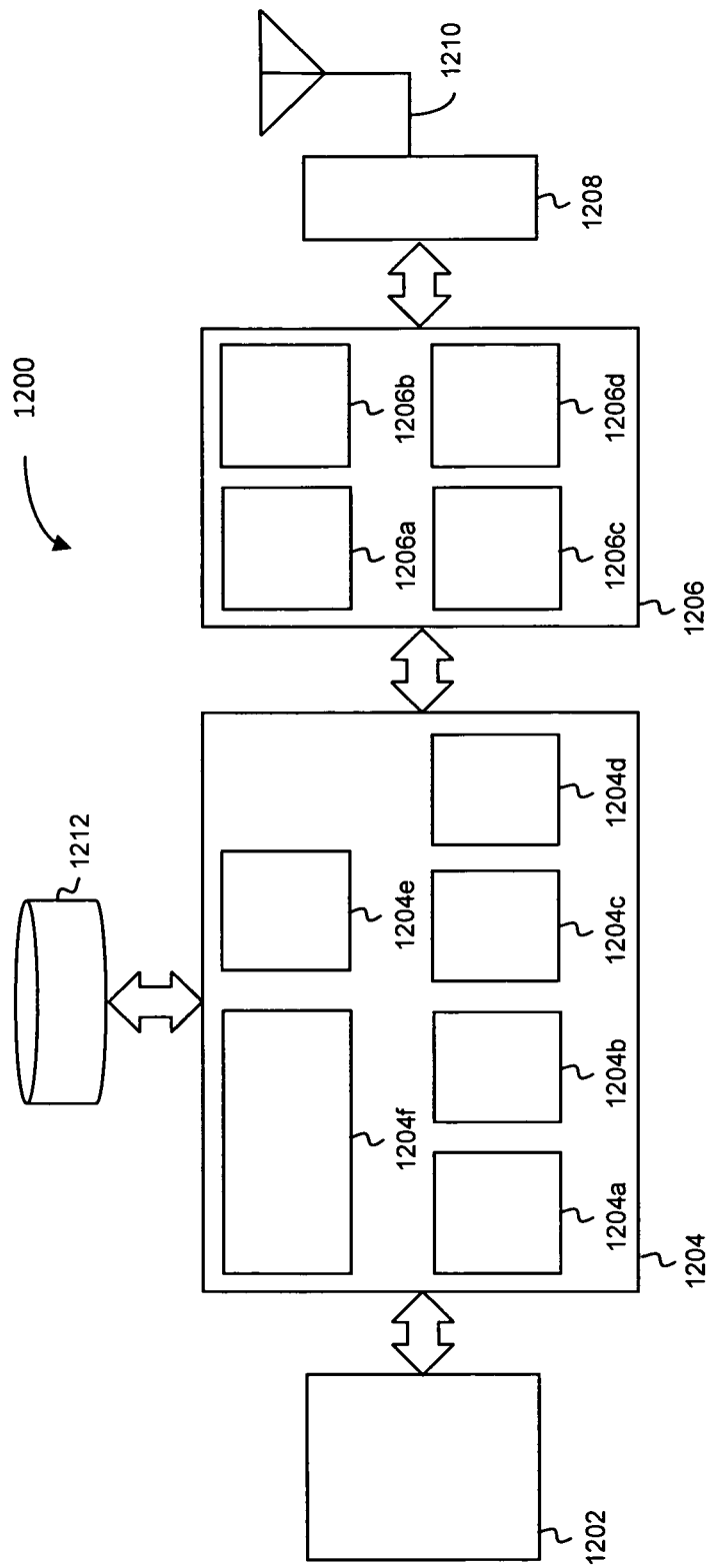
FIG. 12 illustrates a diagram of example components of a User Equipment (UE) device in accordance with an example.

FIG. 12 illustrates, for one aspect, example components of a User Equipment (UE) device 1200. In some aspects, the UE device 1200 can include application circuitry 1202, baseband circuitry 1204, Radio Frequency (RF) circuitry 1206, front-end module (FEM) circuitry 1208 and one or more antennas 1210, coupled together at least as shown.

The application circuitry 1202 can include one or more application processors. For example, the application circuitry 1202 can include circuitry such as, but not limited to, one or more single-core or multi-core processors. The processor(s) can include any combination of general-purpose processors and dedicated processors (e.g., graphics processors, application processors, etc.). The processors can be coupled with and/or can include a storage medium 1212, and can be configured to execute instructions stored in the storage medium 1212 to enable various applications and/or operating systems to run on the system.

The baseband circuitry 1204 can include circuitry such as, but not limited to, one or more single-core or multi-core processors. The baseband circuitry 1204 can include one or more baseband processors and/or control logic to process baseband signals received from a receive signal path of the RF circuitry 1206 and to generate baseband signals for a transmit signal path of the RF circuitry 1206. Baseband processing circuitry 1204 can interface with the application circuitry 1202 for generation and processing of the baseband signals and for controlling operations of the RF circuitry 1206. For example, in some aspects, the baseband circuitry 1204 can include a second generation (2G) baseband processor 1204*a*, third generation (3G) baseband processor 1204*b*, fourth generation (4G) baseband processor 1204*c*, and/or other baseband processor(s) 1204*d* for other existing generations, generations in development or to be developed in the future (e.g., fifth generation (5G), 6G, etc.). The baseband circuitry 1204 (e.g., one or more of baseband processors 1204*a-d*) can handle various radio control functions that enable communication with one or more radio networks via the RF circuitry 1206. The radio control functions can include, but are not limited to, signal modulation/demodulation, encoding/decoding, radio frequency shifting, etc. In some aspects, modulation/demodulation circuitry of the baseband circuitry 1204 can include Fast-Fourier Transform (FFT), precoding, and/or constellation mapping/demapping functionality. In some aspects, encoding/decoding circuitry of the baseband circuitry 1204 can include convolution, tail-biting convolution, turbo, Viterbi, and/or Low Density Parity Check (LDPC) encoder/decoder functionality. Aspects of modulation/demodulation and encoder/decoder functionality are not limited to these examples and can include other suitable functionality in other aspects.

In some aspects, the baseband circuitry 1204 can include elements of a protocol stack such as, for example, elements of an evolved universal terrestrial radio access network (EUTRAN) protocol including, for example, physical (PHY), media access control (MAC), radio link control (RLC), packet data convergence protocol (PDCP), and/or radio resource control (RRC) elements. A central processing unit (CPU) 1204*e* of the baseband circuitry 1204 can be configured to run elements of the protocol stack for signaling of the PHY, MAC, RLC, PDCP and/or RRC layers. In some aspects, the baseband circuitry can include one or more audio digital signal processor(s) (DSP) 1204*f*. The audio DSP(s) 1204*f* can be include elements for compression/decompression and echo cancellation and can include other suitable processing elements in other aspects. Components of the baseband circuitry can be suitably combined in a single chip, a single chipset, or disposed on a same circuit board in some aspects. In some aspects, some or all of the constituent components of the baseband circuitry 1204 and the application circuitry 1202 can be implemented together such as, for example, on a system on a chip (SOC).

In some aspects, the baseband circuitry 1204 can provide for communication compatible with one or more radio technologies. For example, in some aspects, the baseband circuitry 1204 can support communication with an evolved universal terrestrial radio access network (EUTRAN) and/or other wireless metropolitan area networks (WMAN), a wireless local area network (WLAN), a wireless personal area network (WPAN). Aspects in which the baseband circuitry 1204 is configured to support radio communications of more than one wireless protocol can be referred to as multi-mode baseband circuitry.

RF circuitry 1206 can enable communication with wireless networks using modulated electromagnetic radiation through a non-solid medium. In various aspects, the RF circuitry 1206 can include switches, filters, amplifiers, etc. to facilitate the communication with the wireless network. RF circuitry 1206 can include a receive signal path which can include circuitry to down-convert RF signals received from the FEM circuitry 1208 and provide baseband signals to the baseband circuitry 1204. RF circuitry 1206 can also include a transmit signal path which can include circuitry to up-convert baseband signals provided by the baseband circuitry 1204 and provide RF output signals to the FEM circuitry 1208 for transmission.

In some aspects, the RF circuitry 1206 can include a receive signal path and a transmit signal path. The receive signal path of the RF circuitry 1206 can include mixer circuitry 1206a, amplifier circuitry 1206b and filter circuitry 1206c. The transmit signal path of the RF circuitry 1206 can include filter circuitry 1206c and mixer circuitry 1206a. RF circuitry 1206 can also include synthesizer circuitry 1206d for synthesizing a frequency for use by the mixer circuitry 1206a of the receive signal path and the transmit signal path. In some aspects, the mixer circuitry 1206a of the receive signal path can be configured to down-convert RF signals received from the FEM circuitry 1208 based on the synthesized frequency provided by synthesizer circuitry 1206d. The amplifier circuitry 1206b can be configured to amplify the down-converted signals and the filter circuitry 1206c can be a low-pass filter (LPF) or band-pass filter (BPF) configured to remove unwanted signals from the down-converted signals to generate output baseband signals. Output baseband signals can be provided to the baseband circuitry 1204 for further processing. In some aspects, the output baseband signals can be zero-frequency baseband signals, although this is may be optional. In some aspects, mixer circuitry 1206a of the receive signal path can comprise passive mixers, although the scope of the aspects is not limited in this respect.

In some aspects, the mixer circuitry 1206a of the transmit signal path can be configured to up-convert input baseband signals based on the synthesized frequency provided by the synthesizer circuitry 1206d to generate RF output signals for the FEM circuitry 1208. The baseband signals can be provided by the baseband circuitry 1204 and can be filtered by filter circuitry 1206c. The filter circuitry 1206c can include a low-pass filter (LPF), although the scope of the aspects is not limited in this respect.

In some aspects, the mixer circuitry 1206a of the receive signal path and the mixer circuitry 1206a of the transmit signal path can include two or more mixers and can be arranged for quadrature downconversion and/or upconversion respectively. In some aspects, the mixer circuitry 1206a of the receive signal path and the mixer circuitry 1206a of the transmit signal path can include two or more mixers and can be arranged for image rejection (e.g., Hartley image rejection). In some aspects, the mixer circuitry 1206a of the receive signal path and the mixer circuitry 1206a can be arranged for direct downconversion and/or direct upconversion, respectively. In some aspects, the mixer circuitry 1206a of the receive signal path and the mixer circuitry 1206a of the transmit signal path can be configured for super-heterodyne operation.

In some aspects, the output baseband signals and the input baseband signals can be analog baseband signals, although the scope of the aspects is not limited in this respect. In some alternate aspects, the output baseband signals and the input baseband signals can be digital baseband signals. In these alternate aspects, the RF circuitry 1206 can include analog-to-digital converter (ADC) and digital-to-analog converter (DAC) circuitry and the baseband circuitry 1204 can include a digital baseband interface to communicate with the RF circuitry 1206.

In some dual-mode embodiments, a separate radio IC circuitry can be provided for processing signals for each spectrum, although the scope of the embodiments is not limited in this respect.

In some embodiments, the synthesizer circuitry 1206d can be a fractional-N synthesizer or a fractional N/N+1 synthesizer, although the scope of the embodiments is not limited in this respect as other types of frequency synthesizers can be suitable. For example, synthesizer circuitry 1206d can be a delta-sigma synthesizer, a frequency multiplier, or a synthesizer comprising a phase-locked loop with a frequency divider.

The synthesizer circuitry 1206d can be configured to synthesize an output frequency for use by the mixer circuitry 1206a of the RF circuitry 1206 based on a frequency input and a divider control input. In some embodiments, the synthesizer circuitry 1206d can be a fractional N/N+1 synthesizer.

In some embodiments, frequency input can be provided by a voltage controlled oscillator (VCO), although this is may be optional. Divider control input can be provided by either the baseband circuitry 1204 or the applications processor 1202 depending on the desired output frequency. In some embodiments, a divider control input (e.g., N) can be determined from a look-up table based on a channel indicated by the applications processor 1202.

Synthesizer circuitry 1206d of the RF circuitry 1206 can include a divider, a delay-locked loop (DLL), a multiplexer and a phase accumulator. In some embodiments, the divider can be a dual modulus divider (DMD) and the phase accumulator can be a digital phase accumulator (DPA). In some embodiments, the DMD can be configured to divide the input signal by either N or N+1 (e.g., based on a carry out) to provide a fractional division ratio. In some example embodiments, the DLL can include a set of cascaded, tunable, delay elements, a phase detector, a charge pump and a D-type flip-flop. In these embodiments, the delay elements can be configured to break a VCO period up into Nd equal packets of phase, where Nd is the number of delay elements in the delay line. In this way, the DLL provides negative feedback to help ensure that the total delay through the delay line is one VCO cycle.

In some embodiments, synthesizer circuitry 1206d can be configured to generate a carrier frequency as the output frequency, while in other embodiments, the output frequency can be a multiple of the carrier frequency (e.g., twice the carrier frequency, four times the carrier frequency) and used in conjunction with quadrature generator and divider circuitry to generate multiple signals at the carrier frequency with multiple different phases with respect to each other. In some embodiments, the output frequency can be a LO frequency (fLO). In some embodiments, the RF circuitry 1206 can include an IQ/polar converter.

FEM circuitry 1208 can include a receive signal path which can include circuitry configured to operate on RF signals received from one or more antennas 1210, amplify the received signals and provide the amplified versions of the received signals to the RF circuitry 1206 for further processing. FEM circuitry 1208 can also include a transmit signal path which can include circuitry configured to amplify signals for transmission provided by the RF circuitry 1206 for transmission by one or more of the one or more antennas 1210.

In some embodiments, the FEM circuitry 1208 can include a TX/RX switch to switch between transmit mode and receive mode operation. The FEM circuitry can include a receive signal path and a transmit signal path. The receive signal path of the FEM circuitry can include a low-noise amplifier (LNA) to amplify received RF signals and provide the amplified received RF signals as an output (e.g., to the RF circuitry 1206). The transmit signal path of the FEM circuitry 1208 can include a power amplifier (PA) to amplify input RF signals (e.g., provided by RF circuitry 1206), and one or more filters to generate RF signals for subsequent transmission (e.g., by one or more of the one or more antennas 1210.

In some embodiments, the UE device 1200 can include additional elements such as, for example, memory/storage, display, camera, sensor, and/or input/output (I/O) interface.

Figure 13:
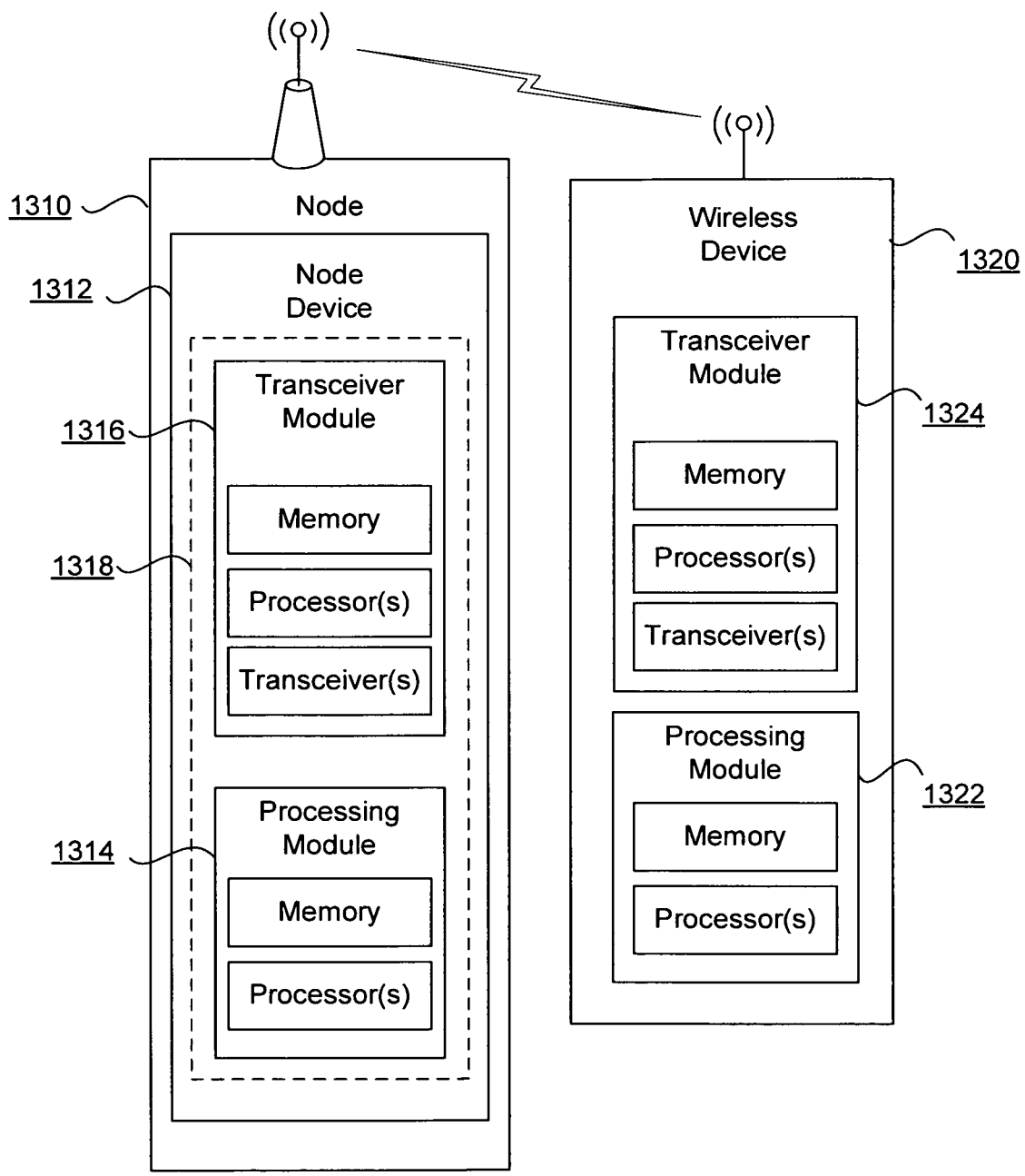
FIG. 13 illustrates a diagram of a node (e.g., eNB) and wireless device (e.g., UE) in accordance with an example.

FIG. 13 illustrates a diagram 1300 of a node 1310 (e.g., eNB and/or a base station) and wireless device (e.g., UE) in accordance with an example. The node can include a base station (BS), a Node B (NB), an evolved Node B (eNB), a baseband unit (BBU), a remote radio head (RRH), a remote radio equipment (RRE), a remote radio unit (RRU), or a central processing module (CPM). In one aspect, the node can be a Serving GPRS Support Node. The node 1310 can include a node device 1312. The node device 1312 or the node 1310 can be configured to communicate with the wireless device 1320. The node device 1312 can be configured to implement the technology described. The node device 1312 can include a processing module 1314 and a transceiver module 1316. In one aspect, the node device 1312 can include the transceiver module 1316 and the processing module 1314 forming a circuitry 1318 for the node 1310. In one aspect, the transceiver module 1316 and the processing module 1314 can form a circuitry of the node device 1312. The processing module 1314 can include one or more processors and memory. In one embodiment, the processing module 1322 can include one or more application processors. The transceiver module 1316 can include a transceiver and one or more processors and memory. In one embodiment, the transceiver module 1316 can include a baseband processor.

The wireless device 1320 can include a transceiver module 1324 and a processing module 1322. The processing module 1322 can include one or more processors and memory. In one embodiment, the processing module 1322 can include one or more application processors. The transceiver module 1324 can include a transceiver and one or more processors and memory. In one embodiment, the transceiver module 1324 can include a baseband processor. The wireless device 1320 can be configured to implement the technology described. The node 1310 and the wireless devices 1320 can also include one or more storage mediums, such as the transceiver module 1316, 1324 and/or the processing module 1314, 1322.

As used herein, the term "circuitry" can refer to, be part of, or include an Application Specific Integrated Circuit (ASIC), an electronic circuit, a processor (shared, dedicated, or group), and/or memory (shared, dedicated, or group) that execute one or more software or firmware programs, a combinational logic circuit, and/or other suitable hardware components that provide the described functionality. In some aspects, the circuitry can be implemented in, or functions associated with the circuitry can be implemented by, one or more software or firmware modules. In some aspects, circuitry can include logic, at least partially operable in hardware.

EXAMPLES

The following examples pertain to specific technology embodiments and point out specific features, elements, or steps that can be used or otherwise combined in achieving such embodiments.

Example 1 includes an apparatus of a user equipment (UE), the UE configured for discovering a network, the apparatus comprising one or more processors and memory configured to: process signals, received from a base station, including a first synchronization signal (SS) and a second SS, wherein the first SS and the second SS are beamformed with a plurality of transmit beams and transmitted on a plurality of subbands in a first set of symbols, for the first SS, and a second set of symbols, for the second SS; detect the first SS in the first set of symbols, and measure beam qualities of the plurality of transmit beams on the plurality of subbands in at least one of the first set of symbols or the second set of symbols; select one or more transmit beams from the plurality of transmit beams and corresponding one or more subbands from the plurality of subbands, based on the measured beam qualities; and detect the second SS on the selected one or more subbands in the second set of symbols, wherein each of plurality of subbands in the first and second sets of symbols is associated with one of the plurality of transmit beams.

Example 2 includes the apparatus of example 1, wherein the one or more processors and memory are further configured to predetermine or configure the first set of symbols and the second set of symbols.

Example 3 includes the apparatus of example 1, wherein the one or more processors and memory are further configured to process the plurality of transmit beams received from one or more cooperative access points (APs).

Example 4 includes the apparatus of example 1 or 3, wherein the one or more cooperative APs are geographically separated.

Example 5 includes the apparatus of example 1 or 3, wherein a beam width and a total number of beams for the plurality of transmit beams are dependent on a target coverage, an operating frequency band, and transmit antenna configurations of the one or more cooperative APs.

Example 6 includes the apparatus of example 1, wherein the one or more processors and memory further configured to: coherently detect the second SS, and obtain channel information for the selected one or more subbands in the second set of symbols from the detected first SS and the received signals on the selected one or more subbands in the first set of symbols.

Example 7 includes the apparatus of example 1 or 6, wherein the measured beam qualities comprise a signal-to-interference and noise ratio (SINR), a reference signal received power (RSRP), a reference signal received quality (RSRQ) or a received signal strength (RSS).

Example 8 includes the apparatus of example 1, wherein the one or more processors and memory are further configured to obtain timing and frequency information of the selected one or more transmit beams, based on detecting the first SS and the second SS.

Example 9 includes the apparatus of example 1 or 8, wherein the one or more processors and memory are further configured to group the one or more transmit beams according to the obtained timing and frequency information.

Example 10 includes the apparatus of example 9, wherein the one or more processors and memory are further configured to refine the timing and frequency information by combining measurements of the grouped one or more transmit beams.

Example 11 includes the apparatus of example 1, wherein the apparatus includes at least one of an antenna, a touch sensitive display screen, a speaker, a microphone, a graphics processor, an application processor, internal memory, a non-volatile memory port, and combinations thereof.

Example 12 includes an apparatus of a user equipment (UE), the UE configured for discovering a network, the apparatus comprising one or more processors and memory configured to: process signals, received from a base station, including a first synchronization signal (SS), wherein the first SS is beamformed with a plurality of transmit beams and transmitted on a plurality of subbands in a first set of symbols; measure beam qualities of each of the plurality of transmit beams on the plurality of subbands in the first set of symbols; identify, by the UE, a subset of one or more transmit beams from the plurality of transmit beams and a subset of one or more subbands from the plurality of subbands; and identify a second SS on a second set of symbols in the subset of the one or more transmit beams on the subset of the one or more subbands, wherein a subband includes a subset of subcarriers from a plurality of subcarriers.

Example 13 includes the apparatus of example 12, wherein the one or more processors and memory are further configured to select one or more transmit beams from the plurality of transmit beams and corresponding one or more subbands from the plurality of subbands, based on the measured beam qualities.

Example 14 includes the apparatus of example 12 or 13, wherein the one or more processors and memory are further configured to associate each subband in the plurality of subbands with a transmit beam in the plurality of transmit beams.

Example 15 includes the apparatus of example 12, wherein the one or more processors and memory are further configured to process the plurality of transmit beams received from one or more cooperative access points (APs).

Example 16 includes the apparatus of example 12 or 15, wherein the one or more cooperative APs are geographically separated.

Example 17 includes the apparatus of example 12, wherein the one or more processors and memory are further configured to predetermine or configure the first set of symbols and the second set of symbols.

Example 18 includes the apparatus of example 12 or 15, wherein a beam width of each beam in the plurality of transmit beams and a total number of beams in the plurality of transmit beams are dependent on a target coverage, an operating frequency band, transmit antenna configurations of the one or more cooperative APs, or a combination thereof.

Example 19 includes the apparatus of example 12, wherein the one or more processors and memory are further configured to coherently detect, by the UE, the second SS, wherein channel information for the subset of the one or more subbands in the second set of symbols is obtained from the first SS and the received signals on the subset of subbands in the first set of symbols.

Example 20 includes the apparatus of example 12 or 19, wherein the one or more processors and memory are further configured to measure a signal-to-interference and noise ratio (SINR), a reference signal received power (RSRP), a reference signal received quality (RSRQ), or a received signal strength (RSS), or a combination thereof for measuring the beam qualities of each of the plurality of transmit beams.

Example 21 includes the apparatus of example 12, wherein the one or more processors and memory are further configured to obtain at least one of timing or frequency information of the subset of the plurality of transmit beams based on the first SS and the second SS.

Example 22 includes the apparatus of example 12 or 21, wherein the one or more processors and memory are further configured to group the subset of transmit beams based on either the timing or frequency information.

Example 23 includes the apparatus of example 22, wherein the one or more processors and memory are further configured to refine at least one of the timing or frequency information by combining measurements of one or more of the grouped subset of transmit beams.

Example 24 includes at least machine readable storage medium having instructions embodied thereon for a user equipment (UE) discovering a network, the instructions when executed perform the following: process received signals including a synchronization signal (SS) beamformed with a plurality of transmit beams and transmitted on a plurality of subbands in a set of symbols; detecting the SS and measure beam qualities of the plurality of transmit beams on the plurality of subbands in the set of symbols; selecting one or more transmit beams from the plurality of transmit beams and corresponding one or more subbands from the plurality of subbands; identifying a subset of the one or more transmit beams from the plurality of transmit beams and a subset of the one or more subbands from the plurality of subbands; and identifying a second SS on a second set of symbols in the subset of the one or more transmit beams on the subset of the one or more subbands.

Example 25 includes the least machine readable storage medium of example 24, further comprising instructions which when executed perform the following: predetermine or configure the set of symbols and the second set of symbols.

Example 26 includes an apparatus of a user equipment (UE), the UE configured for discovering a network, the apparatus comprising one or more processors and memory configured to: process signals, received from a base station, including a first synchronization signal (SS) and a second SS, wherein the first SS and the second SS are beamformed with a plurality of transmit beams and transmitted on a plurality of subbands in a first set of symbols, for the first SS, and a second set of symbols, for the second SS; detect the first SS in the first set of symbols, and measure beam qualities of the plurality of transmit beams on the plurality of subbands in at least one of the first set of symbols or the second set of symbols; select one or more transmit beams from the plurality of transmit beams and corresponding one or more subbands from the plurality of subbands, based on the measured beam qualities; and detect the second SS on the selected one or more subbands in the second set of symbols, wherein each of plurality of subbands in the first and second sets of symbols is associated with one of the plurality of transmit beams.

Example 27 includes the apparatus of example 26, wherein the one or more processors and memory are further configured to: predetermine or configure the first set of symbols and the second set of symbols.

Example 28 includes the apparatus of example 26, wherein the one or more processors and memory are further configured to process the plurality of transmit beams received from one or more cooperative access points (APs).

Example 29 includes the apparatus of example 28, wherein the one or more cooperative APs are geographically separated.

Example 30 includes the apparatus of example 28, wherein a beam width and a total number of beams for the plurality of transmit beams are dependent on a target coverage, an operating frequency band, and transmit antenna configurations of the one or more cooperative APs.

Example 31 includes the apparatus of example 26, wherein the one or more processors and memory further configured to: coherently detect the second SS, and obtain channel information for the selected one or more subbands in the second set of symbols from the detected first SS and the received signals on the selected one or more subbands in the first set of symbols.

Example 32 includes the apparatus of example 31, wherein the measured beam qualities comprise a signal-to-interference and noise ratio (SINR), a reference signal received power (RSRP), a reference signal received quality (RSRQ), or a received signal strength (RSS).

Example 33 includes the apparatus of example 26, wherein the one or more processors and memory are further configured to obtain timing and frequency information of the selected one or more transmit beams, based on detecting the first SS and the second SS.

Example 34 includes the apparatus of example 33, wherein the one or more processors and memory are further configured to group the one or more transmit beams according to the obtained timing and frequency information.

Example 35 includes the apparatus of example 34, wherein the one or more processors and memory are further configured to refine the timing and frequency information by combining measurements of the grouped one or more transmit beams.

Example 36 includes the apparatus of example 26, wherein the apparatus includes at least one of an antenna, a touch sensitive display screen, a speaker, a microphone, a graphics processor, an application processor, internal memory, a non-volatile memory port, and combinations thereof.

Example 37 includes an apparatus of a user equipment (UE), the UE configured for discovering a network, the apparatus comprising one or more processors and memory configured to: process signals, received from a base station, including a first synchronization signal (SS), wherein the first SS is beamformed with a plurality of transmit beams and transmitted on a plurality of subbands in a first set of symbols; measure beam qualities of each of the plurality of transmit beams on the plurality of subbands in the first set of symbols; identify, by the UE, a subset of one or more transmit beams from the plurality of transmit beams and a subset of one or more subbands from the plurality of subbands; and identify a second SS on a second set of symbols in the subset of the one or more transmit beams on the subset of the one or more subbands, wherein a subband includes a subset of subcarriers from a plurality of subcarriers.

Example 38 includes the apparatus of example 37, wherein the one or more processors and memory are further configured to select one or more transmit beams from the plurality of transmit beams and corresponding one or more subbands from the plurality of subbands, based on the measured beam qualities.

Example 39 includes the apparatus of example 38, wherein the one or more processors and memory are further configured to associate each subband in the plurality of subbands with a transmit beam in the plurality of transmit beams.

Example 40 includes the apparatus of example 37, wherein the one or more processors and memory are further configured to process the plurality of transmit beams received from one or more cooperative access points (APs).

Example 41 includes the apparatus of example 40, wherein the one or more cooperative APs are geographically separated.

Example 42 includes the apparatus of example 37, wherein the one or more processors and memory are further configured to predetermine or configure the first set of symbols and the second set of symbols.

Example 43 includes the apparatus of example 40, wherein a beam width of each beam in the plurality of transmit beams and a total number of beams in the plurality of transmit beams are dependent on a target coverage, an operating frequency band, transmit antenna configurations of the one or more cooperative APs, or a combination thereof.

Example 44 includes the apparatus of example 37, wherein the one or more processors and memory are further configured to coherently detect, by the UE, the second SS, wherein channel information for the subset of the one or more subbands in the second set of symbols is obtained from the first SS and the received signals on the subset of subbands in the first set of symbols.

Example 45 includes the apparatus of example 44, wherein the one or more processors and memory are further configured to measure a signal-to-interference and noise ratio (SINR), a reference signal received power (RSRP), a reference signal received quality (RSRQ), or a received signal strength (RSS), or a combination thereof for measuring the beam qualities of each of the plurality of transmit beams.

Example 46 includes the apparatus of example 37, wherein the one or more processors and memory are further configured to obtain at least one of timing or frequency information of the subset of the plurality of transmit beams based on the first SS and the second SS.

Example 47 includes the apparatus of example 46, wherein the one or more processors and memory are further configured to group the subset of transmit beams based on either the timing or frequency information.

Example 48 includes the apparatus of example 47, wherein the one or more processors and memory are further configured to refine at least one of the timing or frequency information by combining measurements of one or more of the grouped subset of transmit beams.

Example 49 includes one or more transitory or non-transitory machine readable storage mediums having instructions embodied thereon for a user equipment (UE) discovering a network, the instructions when executed perform the following: process received signals including a synchronization signal (SS) beamformed with a plurality of transmit beams and transmitted on a plurality of subbands in a set of symbols; detecting the SS and measure beam qualities of the plurality of transmit beams on the plurality of subbands in the set of symbols; selecting one or more transmit beams from the plurality of transmit beams and corresponding one or more subbands from the plurality of subbands; identifying a subset of the one or more transmit beams from the plurality of transmit beams and a subset of the one or more subbands from the plurality of subbands; and identifying a second SS on a second set of symbols in the subset of the one or more transmit beams on the subset of the one or more subbands.

Example 50 includes the one or more transitory or non-transitory machine readable storage mediums of example 49, further comprising instructions which when executed perform the following: predetermine or configure the set of symbols and the second set of symbols.

Example 51 includes an apparatus of a user equipment (UE), the UE configured for discovering a network, the apparatus comprising one or more processors and memory configured to: process signals, received from a base station, including a first synchronization signal (SS) and a second SS, wherein the first SS and the second SS are beamformed with a plurality of transmit beams and transmitted on a plurality of subbands in a first set of symbols, for the first SS, and a second set of symbols, for the second SS; detect the first SS in the first set of symbols, and measure beam qualities of the plurality of transmit beams on the plurality of subbands in at least one of the first set of symbols or the second set of symbols; select one or more transmit beams from the plurality of transmit beams and corresponding one or more subbands from the plurality of subbands, based on the measured beam qualities; and detect the second SS on the selected one or more subbands in the second set of symbols, wherein each of plurality of subbands in the first and second sets of symbols is associated with one of the plurality of transmit beams.

Example 52 includes the apparatus of example 51, wherein the one or more processors and memory are further configured to: predetermine or configure the first set of symbols and the second set of symbols; or process the plurality of transmit beams received from one or more cooperative access points (APs), wherein the one or more cooperative APs are geographically separated and a beam width and a total number of beams for the plurality of transmit beams are dependent on a target coverage, an operating frequency band, and transmit antenna configurations of the one or more cooperative APs.

Example 53 includes the apparatus of example 51 or 52, wherein the one or more processors and memory further configured to: coherently detect the second SS, and obtain channel information for the selected one or more subbands in the second set of symbols from the detected first SS and the received signals on the selected one or more subbands in the first set of symbols, wherein the measured beam qualities comprise a signal-to-interference and noise ratio (SINR), a reference signal received power (RSRP), a reference signal received quality (RSRQ), or a received signal strength (RSS).

In Example 54, the subject matter of Example 51 or any of the Examples described herein may further include, wherein the one or more processors and memory are further configured to obtain timing and frequency information of the selected one or more transmit beams, based on detecting the first SS and the second SS.

In Example 55, the subject matter of Example 51 or any of the Examples described herein may further include, wherein the one or more processors and memory are further configured to; group the one or more transmit beams according to the obtained timing and frequency information; or refine the timing and frequency information by combining measurements of the grouped one or more transmit beams.

In Example 56, the subject matter of Example 51 or any of the Examples described herein may further include, wherein the apparatus includes at least one of an antenna, a touch sensitive display screen, a speaker, a microphone, a graphics processor, an application processor, internal memory, a non-volatile memory port, and combinations thereof.

Example 57 includes an apparatus of a user equipment (UE), the UE configured for discovering a network, the apparatus comprising one or more processors and memory configured to: process signals, received from a base station, including a first synchronization signal (SS), wherein the first SS is beamformed with a plurality of transmit beams and transmitted on a plurality of subbands in a first set of symbols; measure beam qualities of each of the plurality of transmit beams on the plurality of subbands in the first set of symbols; identify, by the UE, a subset of one or more transmit beams from the plurality of transmit beams and a subset of one or more subbands from the plurality of subbands; and identify a second SS on a second set of symbols in the subset of the one or more transmit beams on the subset of the one or more subbands, wherein a subband includes a subset of subcarriers from a plurality of subcarriers.

Example 58 includes the apparatus of example 57, wherein the one or more processors and memory are further configured to: select one or more transmit beams from the plurality of transmit beams and corresponding one or more subbands from the plurality of subbands, based on the measured beam qualities; associate each subband in the plurality of subbands with a transmit beam in the plurality of transmit beams; or process the plurality of transmit beams received from one or more cooperative access points (APs), wherein the one or more cooperative APs are geographically separated.

Example 59 includes the apparatus of example 57 or 58, wherein the one or more processors and memory are further configured to predetermine or configure the first set of symbols and the second set of symbols, wherein a beam width of each beam in the plurality of transmit beams and a total number of beams in the plurality of transmit beams are dependent on a target coverage, an operating frequency band, transmit antenna configurations of the one or more cooperative APs, or a combination thereof.

In Example 60, the subject matter of Example 57 or any of the Examples described herein may further include, wherein the one or more processors and memory are further configured to coherently detect, by the UE, the second SS, wherein channel information for the subset of the one or more subbands in the second set of symbols is obtained from the first SS and the received signals on the subset of subbands in the first set of symbols.

In Example 61, the subject matter of Example 57 or any of the Examples described herein may further include, wherein the one or more processors and memory are further configured to measure a signal-to-interference and noise ratio (SINR), a reference signal received power (RSRP), a reference signal received quality (RSRQ), or a received signal strength (RSS), or a combination thereof for measuring the beam qualities of each of the plurality of transmit beams In Example 62, the subject matter of Example 57 or any of the Examples described herein may further include, wherein the one or more processors and memory are further configured to obtain at least one of timing or frequency information of the subset of the plurality of transmit beams based on the first SS and the second SS.

In Example 63, the subject matter of Example 57 or any of the Examples described herein may further include, wherein the one or more processors and memory are further configured to: group the subset of transmit beams based on either the timing or frequency information; or refine at least one of the timing or frequency information by combining measurements of one or more of the grouped subset of transmit beams.

Example 64 includes one or more transitory or non-transitory machine readable storage mediums having instructions embodied thereon for a user equipment (UE) discovering a network, the instructions when executed perform the following: process received signals including a synchronization signal (SS) beamformed with a plurality of transmit beams and transmitted on a plurality of subbands in a set of symbols; detecting the SS and measure beam qualities of the plurality of transmit beams on the plurality of subbands in the set of symbols; selecting one or more transmit beams from the plurality of transmit beams and corresponding one or more subbands from the plurality of subbands; identifying a subset of the one or more transmit beams from the plurality of transmit beams and a subset of the one or more subbands from the plurality of subbands; and identifying a second SS on a second set of symbols in the subset of the one or more transmit beams on the subset of the one or more subbands.

Example 65 includes the one or more transitory or non-transitory machine readable storage mediums of claim 64, further comprising instructions which when executed perform the following: predetermine or configure the set of symbols and the second set of symbols.

Example 66 includes a device for discovering a network, the device comprising: means for process received signals including a synchronization signal (SS) beamformed with a plurality of transmit beams and transmitted on a plurality of subbands in a set of symbols; means for detecting the SS and measure beam qualities of the plurality of transmit beams on the plurality of subbands in the set of symbols; means for selecting one or more transmit beams from the plurality of transmit beams and corresponding one or more subbands from the plurality of subbands; means for identifying a subset of the one or more transmit beams from the plurality of transmit beams and a subset of the one or more subbands from the plurality of subbands; and means for identifying a second SS on a second set of symbols in the subset of the one or more transmit beams on the subset of the one or more subbands.

Example 67 includes the device of example 66, further comprising means for predetermining or configuring the set of symbols and the second set of symbols.

As used herein, the term "circuitry" can refer to, be part of, or include an Application Specific Integrated Circuit (ASIC), an electronic circuit, a processor (shared, dedicated, or group), and/or memory (shared, dedicated, or group) that execute one or more software or firmware programs, a combinational logic circuit, and/or other suitable hardware components that provide the described functionality. In some aspects, the circuitry can be implemented in, or functions associated with the circuitry can be implemented by, one or more software or firmware modules. In some aspects, circuitry can include logic, at least partially operable in hardware.

Various techniques, or certain aspects or portions thereof, can take the form of program code (i.e., instructions) embodied in tangible media, such as floppy diskettes, compact disc-read-only memory (CD-ROMs), hard drives, non-transitory computer readable storage medium, or any other machine-readable storage medium wherein, when the program code is loaded into and executed by a machine, such as a computer, the machine becomes an apparatus for practicing the various techniques. Circuitry can include hardware, firmware, program code, executable code, computer instructions, and/or software. A non-transitory computer readable storage medium can be a computer readable storage medium that does not include signal. In the case of program code execution on programmable computers, the computing device can include a processor, a storage medium readable by the processor (including volatile and non-volatile memory and/or storage elements), at least one input device, and at least one output device. The volatile and non-volatile memory and/or storage elements can be a random-access memory (RAM), erasable programmable read only memory (EPROM), flash drive, optical drive, magnetic hard drive, solid state drive, or other medium for storing electronic data. The node and wireless device can also include a transceiver module (i.e., transceiver), a counter module (i.e., counter), a processing module (i.e., processor), and/or a clock module (i.e., clock) or timer module (i.e., timer). One or more programs that can implement or utilize the various techniques described herein can use an application programming interface (API), reusable controls, and the like. Such programs can be implemented in a high level procedural or object oriented programming language to communicate with a computer system. However, the program(s) can be implemented in assembly or machine language, if desired. In any case, the language can be a compiled or interpreted language, and combined with hardware implementations.

As used herein, the term processor can include general purpose processors, specialized processors such as VLSI, FPGAs, or other types of specialized processors, as well as base band processors used in transceivers to send, receive, and process wireless communications.

It should be understood that many of the functional units described in this specification have been labeled as modules, in order to more particularly emphasize their implementation independence. For example, a module can be implemented as a hardware circuit comprising custom very-large-scale integration (VLSI) circuits or gate arrays, off-the-shelf semiconductors such as logic chips, transistors, or other discrete components. A module can also be implemented in programmable hardware devices such as field programmable gate arrays, programmable array logic, programmable logic devices or the like.

Modules can also be implemented in software for execution by various types of processors. An identified module of executable code can, for instance, comprise one or more physical or logical blocks of computer instructions, which can, for instance, be organized as an object, procedure, or function. Nevertheless, the executables of an identified module may not be physically located together, but can comprise disparate instructions stored in different locations which, when joined logically together, comprise the module and achieve the stated purpose for the module.

Indeed, a module of executable code can be a single instruction, or many instructions, and can even be distributed over several different code segments, among different programs, and across several memory devices. Similarly, operational data can be identified and illustrated herein within modules, and can be embodied in any suitable form and organized within any suitable type of data structure. The operational data can be collected as a single data set, or can be distributed over different locations including over different storage devices, and can exist, at least partially, merely as electronic signals on a system or network. The modules can be passive or active, including agents operable to perform desired functions.

Reference throughout this specification to "an example" or "exemplary" means that a particular feature, structure, or characteristic described in connection with the example is included in at least one embodiment of the present technology. Thus, appearances of the phrases "in an example" or the word "exemplary" in various places throughout this specification are not necessarily all referring to the same embodiment.

As used herein, a plurality of items, structural elements, compositional elements, and/or materials can be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. In addition, various embodiments and example of the present technology can be referred to herein along with alternatives for the various components thereof. It is understood that such embodiments, examples, and alternatives are not to be construed as defacto equivalents of one another, but are to be considered as separate and autonomous representations of the present technology.

Furthermore, the described features, structures, or characteristics can be combined in any suitable manner in one or more embodiments. In the following description, numerous specific details are provided, such as examples of layouts, distances, network examples, etc., to provide a thorough understanding of embodiments of the technology. One skilled in the relevant art will recognize, however, that the technology can be practiced without one or more of the specific details, or with other methods, components, layouts, etc. In other instances, well-known structures, materials, or operations are not shown or described in detail to avoid obscuring aspects of the technology.

While the forgoing examples are illustrative of the principles of the present technology in one or more particular applications, it will be apparent to those of ordinary skill in the art that numerous modifications in form, usage and details of implementation can be made without the exercise of inventive faculty, and without departing from the principles and concepts of the technology. Accordingly, it is not intended that the technology be limited, except as by the claims set forth below.

What is claimed is:

1. An apparatus of a user equipment (UE), the UE configured for discovering a network, the apparatus comprising one or more processors and memory configured to:
process signals, received from a base station, including a first synchronization signal (SS) and a second SS, wherein the first SS and the second SS are beamformed with a plurality of transmit beams and transmitted on a plurality of subbands in a first set of symbols, for the first SS, and a second set of symbols, for the second SS;
detect the first SS in the first set of symbols, and measure beam qualities of the plurality of transmit beams on the plurality of subbands in at least one of the first set of symbols or the second set of symbols;
select one or more transmit beams from the plurality of transmit beams and corresponding one or more subbands from the plurality of subbands, based on the measured beam qualities; and
detect the second SS on the selected one or more subbands in the second set of symbols, wherein each of plurality of subbands in the first and second sets of symbols is associated with one of the plurality of transmit beams.

2. The apparatus of claim 1, wherein the one or more processors and memory are further configured to predetermine or configure the first set of symbols and the second set of symbols.

3. The apparatus of claim 1, wherein the one or more processors and memory are further configured to process the plurality of transmit beams received from one or more cooperative access points (APs).

4. The apparatus of claim 3, wherein the one or more cooperative APs are geographically separated.

5. The apparatus of claim 3, wherein a beam width and a total number of beams for the plurality of transmit beams are dependent on a target coverage, an operating frequency band, and transmit antenna configurations of the one or more cooperative APs.

6. The apparatus of claim 1, wherein the one or more processors and memory further configured to:
coherently detect the second SS, and
obtain channel information for the selected one or more subbands in the second set of symbols from the detected first SS and the received signals on the selected one or more subbands in the first set of symbols.

7. The apparatus of claim 1, wherein the measured beam qualities comprise a signal-to-interference and noise ratio (SINK), a reference signal received power (RSRP), a reference signal received quality (RSRQ), or a received signal strength (RSS).

8. The apparatus of claim 1, wherein the one or more processors and memory are further configured to obtain timing and frequency information of the selected one or more transmit beams, based on detecting the first SS and the second SS.

9. The apparatus of claim 1, wherein the one or more processors and memory are further configured to group the one or more transmit beams according to the obtained timing and frequency information.

10. The apparatus of claim 9, wherein the one or more processors and memory are further configured to refine the timing and frequency information by combining measurements of the grouped one or more transmit beams.

11. The apparatus of claim 1, wherein the apparatus includes at least one of an antenna, a touch sensitive display screen, a speaker, a microphone, a graphics processor, an application processor, internal memory, a non-volatile memory port, and combinations thereof.

12. An apparatus of a user equipment (UE), the UE configured for discovering a network, the apparatus comprising one or more processors and memory configured to:
process signals, received from a base station, including a first synchronization signal (SS), wherein the first SS is beamformed with a plurality of transmit beams and transmitted on a plurality of subbands in a first set of symbols;

measure beam qualities of each of the plurality of transmit beams on the plurality of subbands in the first set of symbols;

identify, by the UE, a subset of one or more transmit beams from the plurality of transmit beams and a subset of one or more subbands from the plurality of subbands; and identify a second SS on a second set of symbols in the subset of the one or more transmit beams on the subset of the one or more subbands, wherein a subband includes a subset of subcarriers from a plurality of subcarriers.

13. The apparatus of claim 12, wherein the one or more processors and memory are further configured to select one or more transmit beams from the plurality of transmit beams and corresponding one or more subbands from the plurality of subbands, based on the measured beam qualities.

14. The apparatus of claim 12, wherein the one or more processors and memory are further configured to associate each subband in the plurality of subbands with a transmit beam in the plurality of transmit beams.

15. The apparatus of claim 12, wherein the one or more processors and memory are further configured to process the plurality of transmit beams received from one or more cooperative access points (APs).

16. The apparatus of claim 15, wherein the one or more cooperative APs are geographically separated.

17. The apparatus of claim 12, wherein the one or more processors and memory are further configured to predetermine or configure the first set of symbols and the second set of symbols.

18. The apparatus of claim 15, wherein a beam width of each beam in the plurality of transmit beams and a total number of beams in the plurality of transmit beams are dependent on a target coverage, an operating frequency band, transmit antenna configurations of the one or more cooperative APs, or a combination thereof.

19. The apparatus of claim 12, wherein the one or more processors and memory are further configured to coherently detect, by the UE, the second SS, wherein channel information for the subset of the one or more subbands in the second set of symbols is obtained from the first SS and the received signals on the subset of subbands in the first set of symbols.

20. The apparatus of claim 12, wherein the one or more processors and memory are further configured to measure a signal-to-interference and noise ratio (SINR), a reference signal received power (RSRP), a reference signal received quality (RSRQ), or a received signal strength (RSS), or a combination thereof for measuring the beam qualities of each of the plurality of transmit beams.

21. The apparatus of claim 12, wherein the one or more processors and memory are further configured to obtain at least one of timing or frequency information of the subset of the plurality of transmit beams based on the first SS and the second SS.

22. The apparatus of claim 12, wherein the one or more processors and memory are further configured to group the subset of transmit beams based on either the timing or frequency information.

23. The apparatus of claim 22, wherein the one or more processors and memory are further configured to refine at least one of the timing or frequency information by combining measurements of one or more of the grouped subset of transmit beams.

24. At least one non-transitory machine readable storage medium having instructions embodied thereon for a user equipment (UE) discovering a network, the instructions when executed perform the following:

processing received signals including a synchronization signal (SS) beamformed with a plurality of transmit beams and transmitted on a plurality of subbands in a set of symbols;

detecting the SS and measuring beam qualities of the plurality of transmit beams on the plurality of subbands in the set of symbols;

selecting one or more transmit beams from the plurality of transmit beams and corresponding one or more subbands from the plurality of subbands;

identifying a subset of the one or more transmit beams from the plurality of transmit beams and a subset of the one or more subbands from the plurality of subbands; and identifying a second SS on a second set of symbols in the subset of the one or more transmit beams on the subset of the one or more subbands.

25. The at least one non-transitory machine readable storage medium of claim 24, further comprising instructions which when executed perform the following: predetermining or configure the set of symbols and the second set of symbols.

* * * * *